United States Patent

[11] 3,575,256

| [72] | Inventors | Zbigniew J. Jania<br>Northville, Mich.;<br>Elliott Josephson, Los Altos, Calif. |
|---|---|---|
| [21] | Appl. No. | 798,672 |
| [22] | Filed | Feb. 12, 1969 |
| [45] | Patented | Apr. 20, 1971 |
| [73] | Assignees | Ford Motor Company<br>Dearborn, Mich.<br>said Jania assignor;<br>Philco-Ford Corporation<br>Philadelphia, Pa., Said Josephson assignor |

[54] SPEED CONTROL SYSTEM FOR AN AUTOMOTIVE VEHICLE
16 Claims, 6 Drawing Figs.

| [52] | U.S. Cl. | 180/105E,<br>180/109, 123/102 |
|---|---|---|
| [51] | Int. Cl. | B60k 31/00 |
| [50] | Field of Search | 180/105–<br>–109; 123/102, 103 |

[56] References Cited
UNITED STATES PATENTS

| 3,381,771 | 5/1968 | Granger et al. | 180/105 |
|---|---|---|---|
| 3,409,102 | 11/1968 | Neapolitakis et al. | 180/109 |
| 3,447,624 | 6/1969 | Balan et al. | 180/105 |
| 3,455,411 | 7/1969 | Carp et al. | 180/105 |
| 3,485,316 | 12/1969 | Slavin et al. | 180/105 |
| 3,496,535 | 2/1970 | Tyzack | 180/106X |

*Primary Examiner*—Kenneth H. Betts
*Attorneys*—John R. Faulkner and Keith L. Zerschling ABSTRACT: This disclosure relates to a speed control system for an automotive vehicle operated by an internal combustion engine and includes a controller means or throttle coupled to the internal combustion engine for controlling the output power of the engine and the speed of the vehicle. Means are provided in the system for producing a first electrical signal corresponding to the actual speed of the vehicle and means are also provided for producing a second electrical signal corresponding to the position of the throttle or controller means. There are also means provided for producing a signal corresponding to a desired or set speed of the vehicle. Power actuating means in the form of a servomotor is coupled to the controller or throttle means for controlling the position of the throttle or controller means and a memory is provided for storing the signal corresponding to the set or desired speed of the vehicle. Means, preferably in the form of a differential amplifier, receive the first, second and third signals and combine them to produce an actuating error signal which is applied through circuit means to the power actuating means or servomotor to operate the controller means or throttle. The memory means for storing the signal corresponding to the desired speed ro set speed of the vehicle is connected or coupled to this circuit means for producing and storing a signal when the servomotor or power actuator begins to control the position of the controller means or throttle upon command by the vehicle operator.

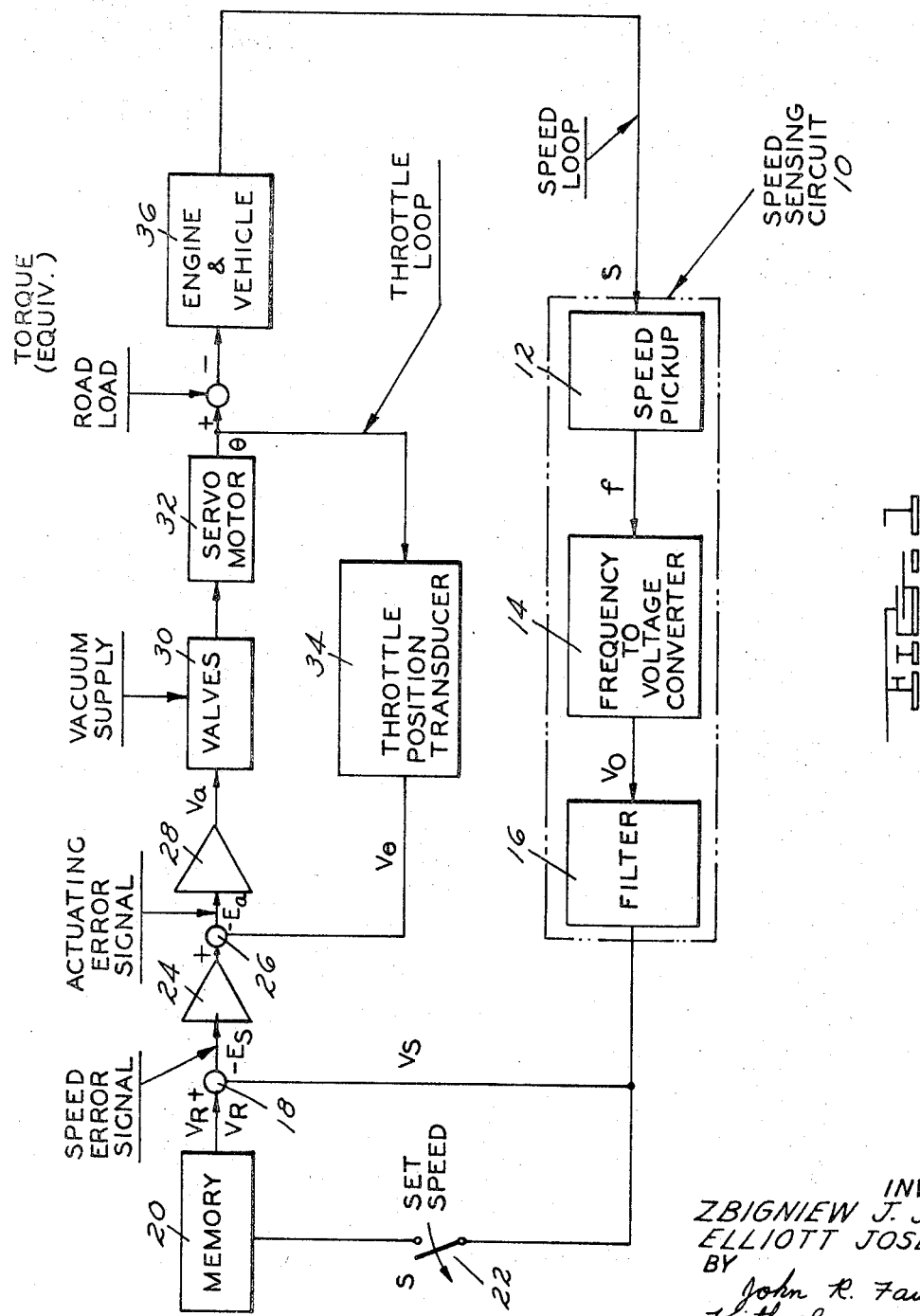

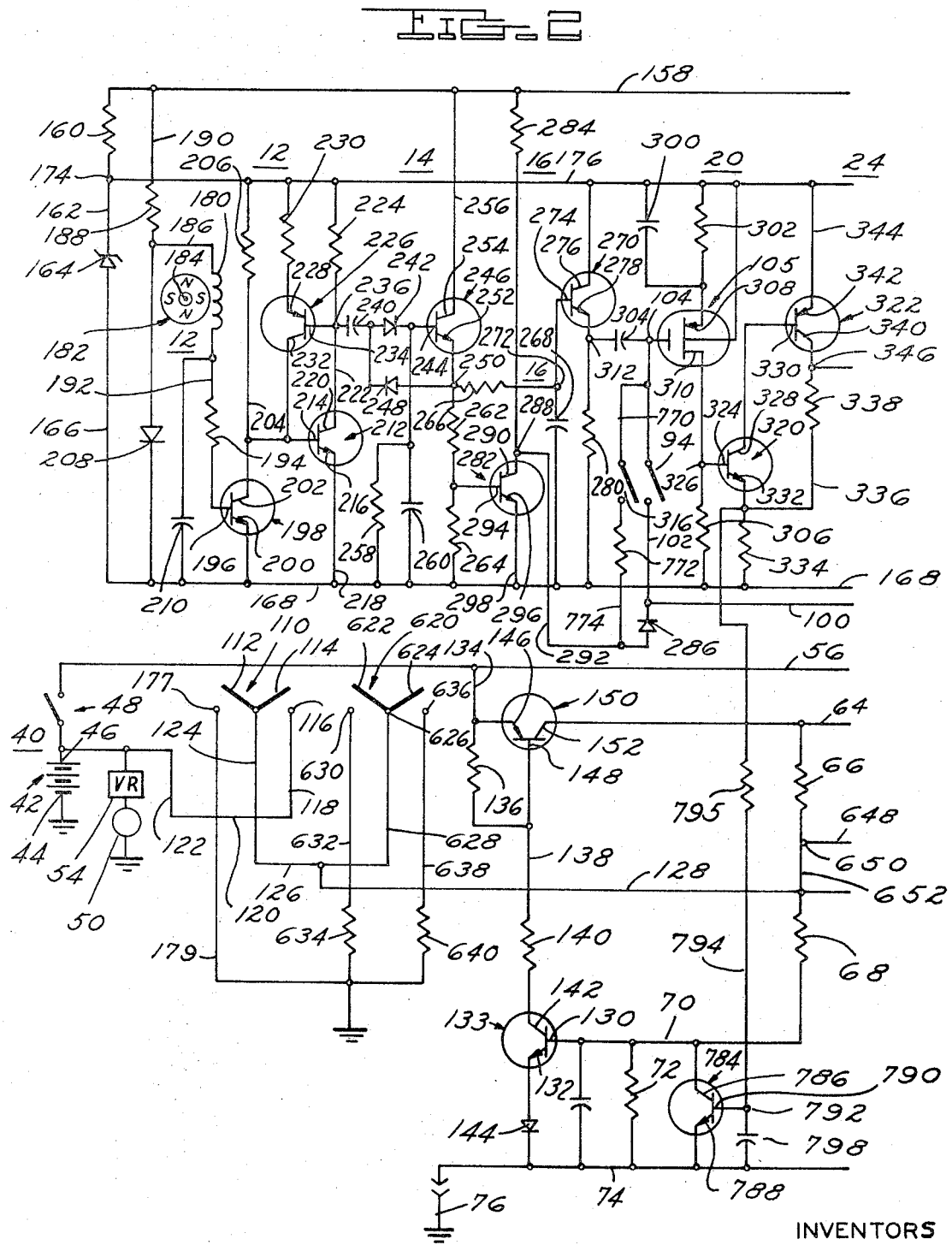

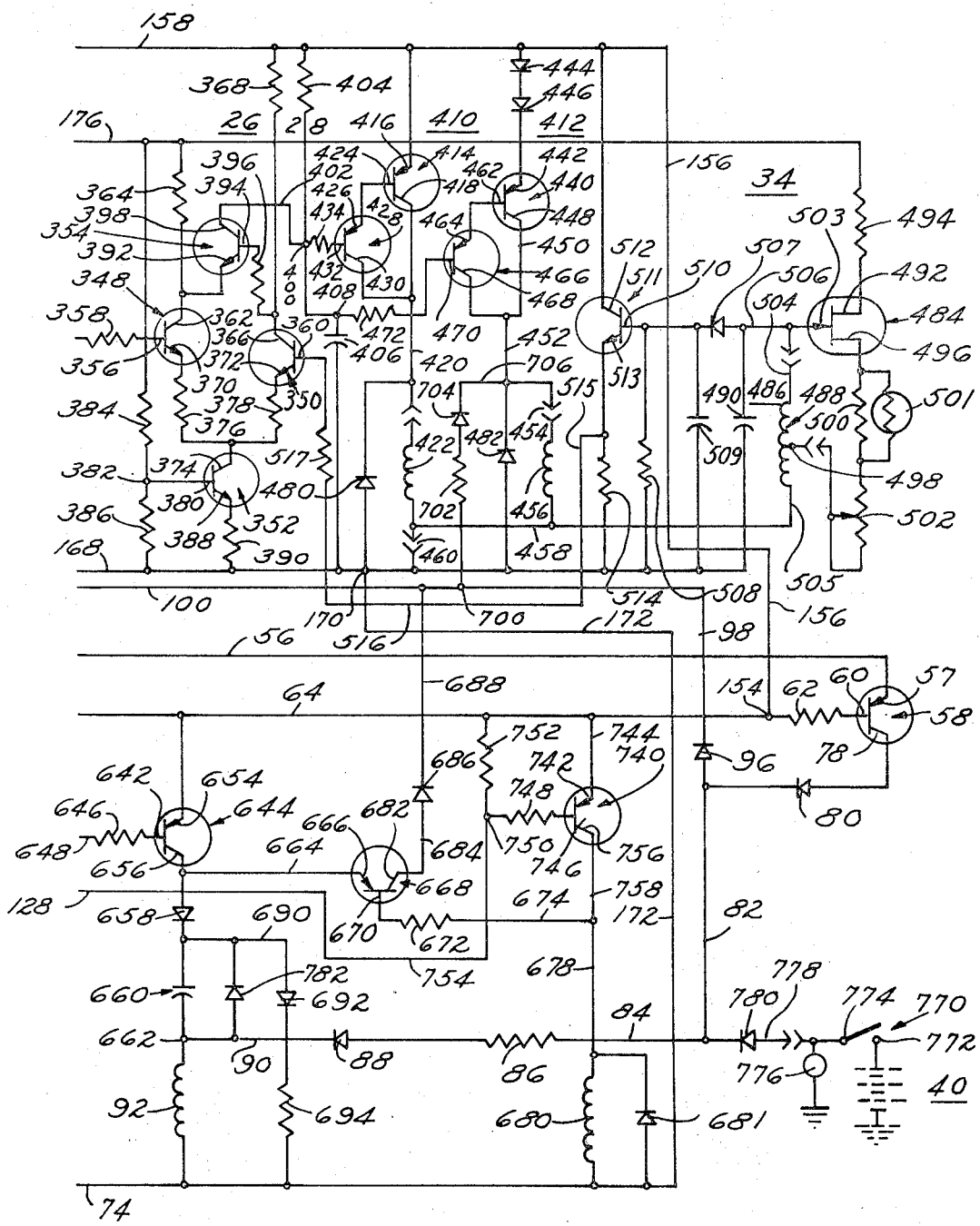

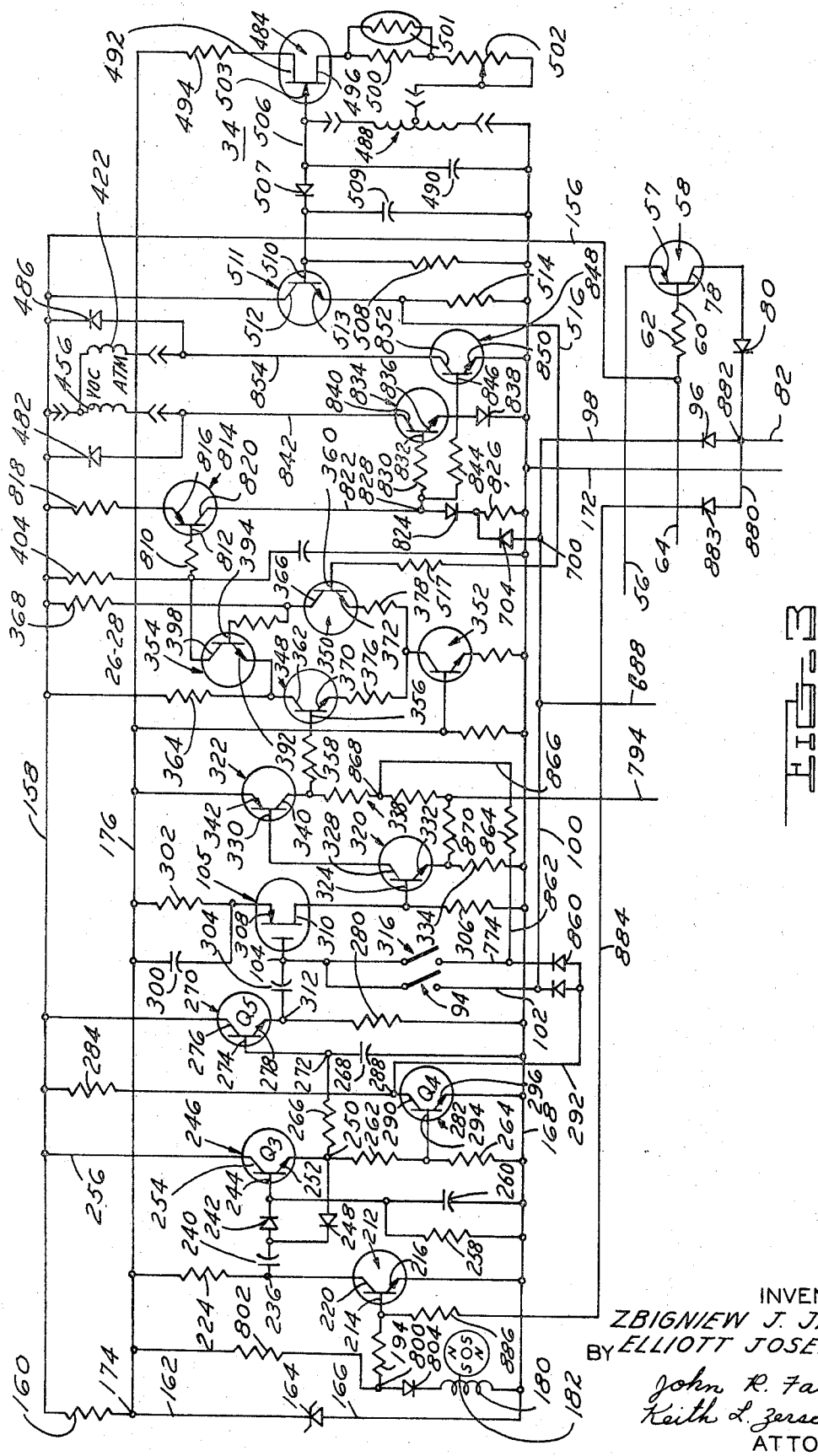

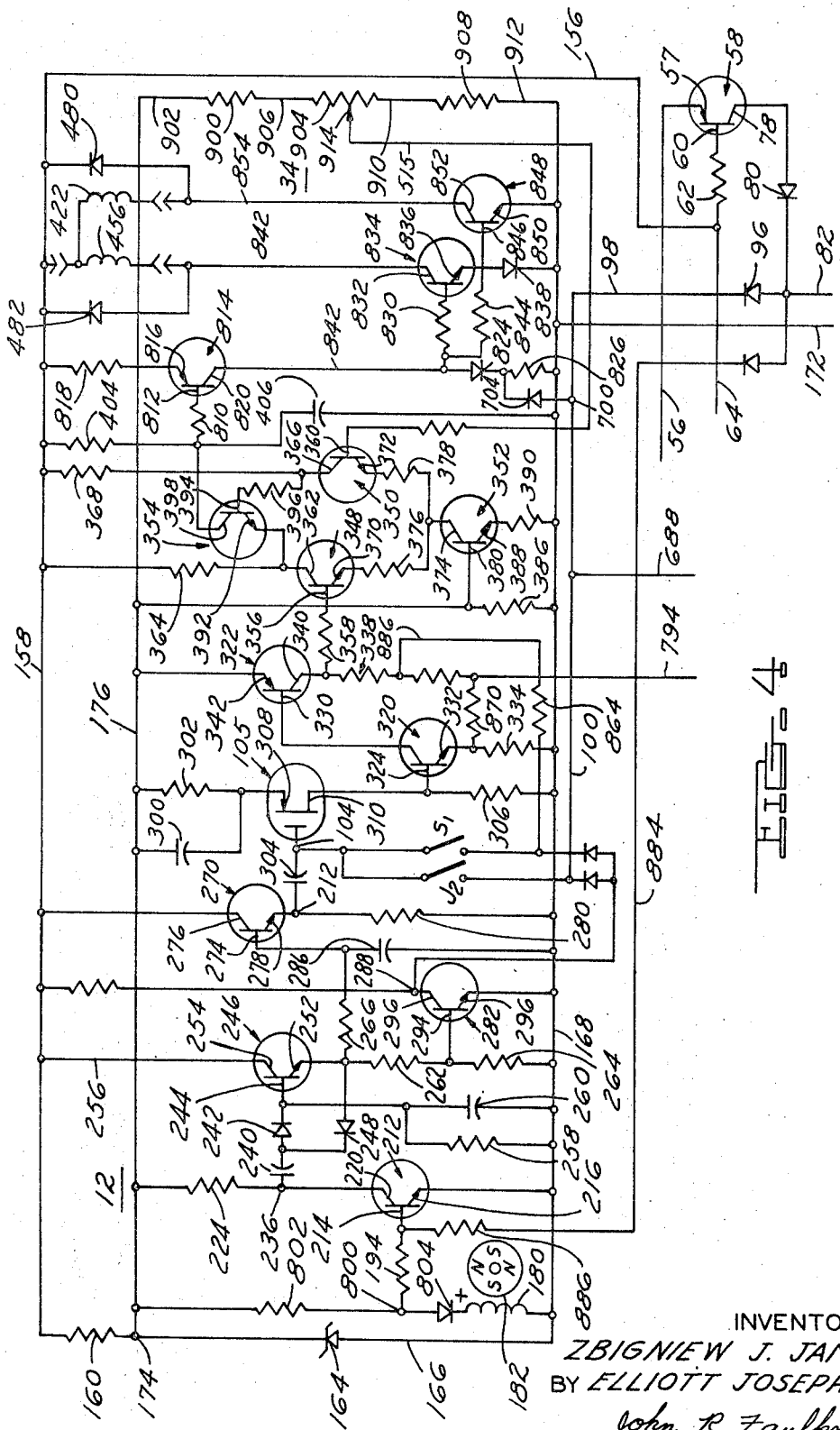

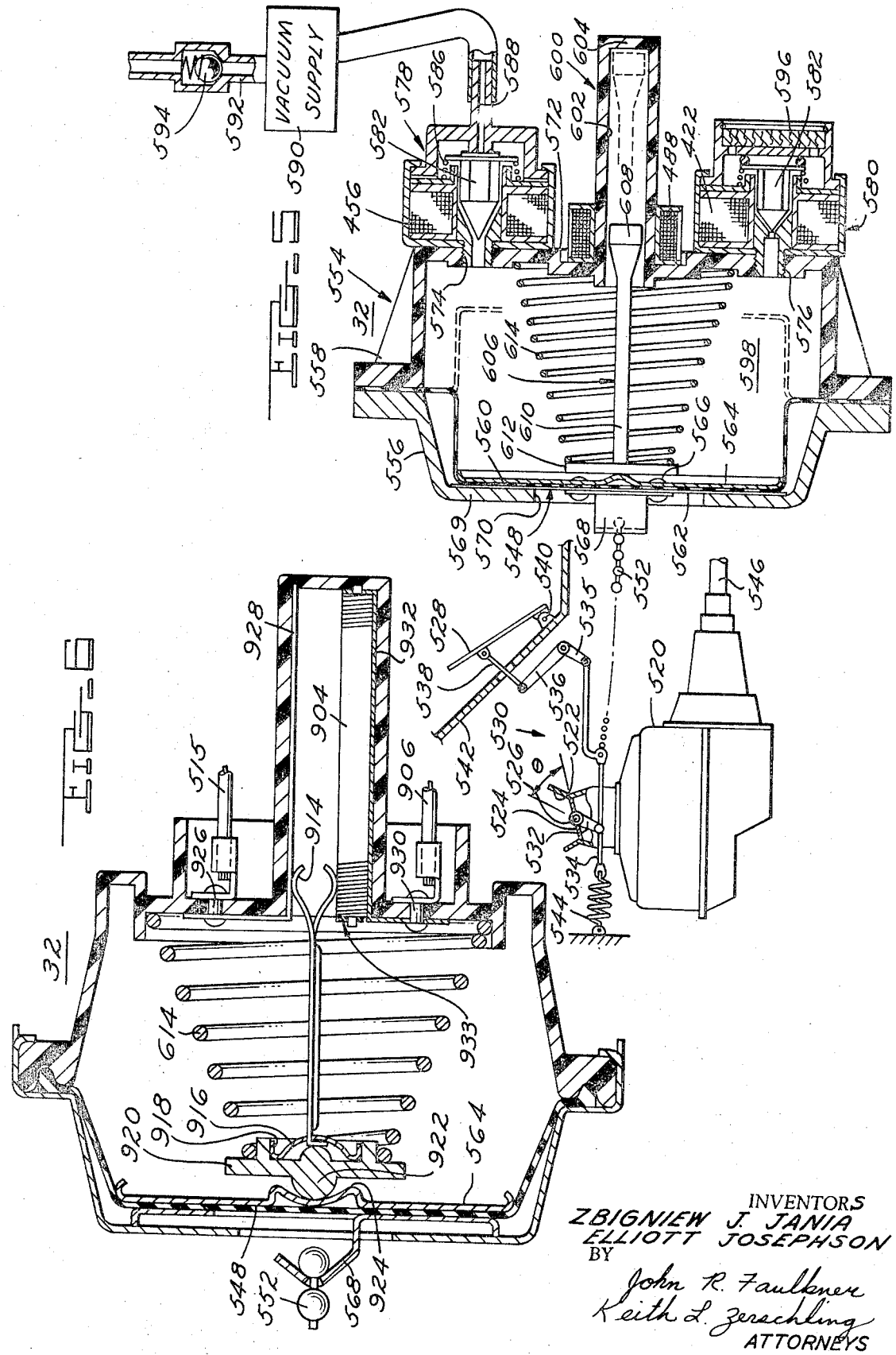

SPEED CONTROL SYSTEM FOR AN AUTOMOTIVE VEHICLE

BACKGROUND OF THE INVENTION

This invention is in the field of speed control systems for automotive vehicles and relates particularly to an electronic speed control system which has a minimum of moving parts.

Numerous speed control systems have been proposed for automotive vehicles and those currently used are of the pneumatic type which employ air pressure signals to control the position of the throttle of an internal combustion engine mounted in the vehicle. Other types of speed control systems for automotive vehicles have been proposed utilizing solid-state electronic components to provide the proper signals necessary for the operation of the speed control system and combining them in proper fashion to control the throttle of the vehicle. Many of these systems include a variable impedance means, for example, a variable resistor which is set by the vehicle operator to a desired speed of the vehicle. For example, if the vehicle operator wishes to operate the vehicle at 60 m.p.h. he will turn a knob in the instrument panel calibrated in miles per hour to the 60 m.p.h. setting. Means are employed for generating a signal which is a function of the speed of the automotive vehicle and the two signals are compared to provide an actuating error signal that is applied to a power actuator connected to the throttle of the vehicle. In addition, other systems have been proposed in which an additional signal in the form of a feedback signal proportional to the setting of the throttle is combined with these two signals to be applied to the power actuator.

In many of the above described systems it is essential that the various components, for example, transistors, resistors, capacitors and inductors be selected with great care so that their operating parameters are within very narrow limits. Moreover, it is often necessary to test the completed system after it is assembled and set a calibrating resistor to a desired value in order for the system to operate properly. These systems also become inaccurate and unreliable when the values of the various components change due to use and aging.

The speed control system of the present invention overcomes these disadvantages by providing a memory signal which is a function of the desired or set speed of the vehicle without the vehicle operator actually having to set this signal into the system. He merely has to depress certain actuating switches which may be located on the steering wheel of the vehicle to set this signal into the system. When the vehicle is traveling at a certain speed, for example, at 60 m.p.h., and the vehicle operator wishes to maintain this speed, all he need do is to depress momentarily a pushbutton switch which will automatically produce a signal corresponding to the desired or set speed, i.e., 60 m.p.h. This signal will be stored in the system to be compared with a signal which corresponds to or is a function of the actual speed of the vehicle. A speed error signal is generated from the comparison of these two signals and is combined with the feedback signal, which is a function of the position of the controller means or throttle of the internal combustion engine of the automotive vehicle in which the speed control system is mounted. This may be accomplished through a differential amplifier and the output of the amplifier is used to control the power actuator connected to the controller or throttle means. All of these features eliminate disadvantages of the prior art systems and permit the use of electrical and electronic components having wide tolerances in their values. Additionally, it compensates for changes in the parameters of these components due to temperature and aging. It will be noted also that it eliminates any need for the vehicle operator to manually set into the system a desired speed at which he wishes to operate the vehicle.

SUMMARY OF THE INVENTION

The present invention relates to an electronic speed control system for an automotive vehicle in which a speed pickup, preferably in the form of a small alternating current generator, is driven at a speed proportional to vehicle speed and produces an output signal having a frequency proportional to vehicle speed. This signal is applied to one terminal of a capacitor which has its other terminal connected to the control electrode of a very high input impedance solid-state amplifier, for example, the gate electrode of a field effect transistor whose gate or input impedance may be on the order of $10_{13}$ ohms.

A servomotor or power actuator, preferably in the form of a vacuum motor having an atmosphere valve and a vacuum valve connected to a vacuum supply, is connected to control the position of the controller means or throttle of the internal combustion engine positioned in the automotive vehicle. A throttle position transducer is coupled to the power actuator or servomotor for producing an output signal which is proportional to or is a function of the position of the power output means of the servomotor, for example, the diaphragm in a vacuum motor, and hence is a function of the angular opening of the controller means or throttle. This throttle position transducer produces an output signal which is in essence a feedback signal having an increasing amplitude as the controller or throttle means is moved from its closed or idle position toward its fully open or wide open throttle position. A differential amplifier may be used to compare the speed error signal, which is a signal proportional to the difference of the actual speed of the vehicle and the desired speed of the vehicle, with this feedback signal from the throttle position transducer thereby producing an actuating error signal. The actuating error signal may be amplified and then applied to operate the power actuator, for example, this actuating error signal may be applied to solenoid windings that operate the atmosphere and vacuum valves of a vacuum motor.

The signal corresponding to the desired or set speed of the vehicle appears across the plates or terminals of the capacitor coupled to the gate or control electrode of the field-effect transistor or high input impedance solid state amplifier. This voltage is set by the vehicle operator when he depresses a pushbutton switch momentarily. The closing of the pushbutton switch operates certain electronic circuits that temporarily close a switch that couples the control or gate electrode of the solid-state high input impedance or field-effect transistor and one terminal of the capacitor to certain solid-state switching means that control the switching or current flow through the solenoid windings of the atmosphere and vacuum valves. This will discharge the capacitor which has previously been set by means to be described subsequently to a very high positive potential from the source of electrical energy in the automotive vehicle thereby keeping this solid-state high input impedance amplifier or field-effect transistor in a nonconducting state. The closing of this switching means discharges this capacitor until such time as the solid-state switching means connected to either the solenoid winding of the atmosphere valve or vacuum valve come into conducting states. At this time, the discharging of the capacitor stops and the switching means coupling the capacitor and the input or gate electrode of the solid-state high input impedance amplifier or field-effect transistor to these solid-state switching means opens, thereby setting a voltage corresponding to the desired or set speed of the vehicle across the capacitor. Since one terminal of the capacitor is now connected solely to the input impedance of the high input impedance solid-state amplifier or field-effect transitor this voltage across the capacitor will remain constant for substantially an indefinite time period.

Electrical circuit means are provided for charging the gate or control electrode of the high input impedance solid-state amplifier or field-effect transistor and hence one plate of the capacitor to the terminal voltage of the source of electrical energy when the ignition switch of the vehicle is closed. This operation assures that the solid-state amplifier or field-effect transistor will be in the nonconducting state and hence will prevent any operation of the servomotor or vacuum motor discussed above. Circuit means are also provided for charging this gate electrode or control electrode of the field-effect transistor or high input impedance solid-state amplifier to the positive potential of this source of electrical energy when the vehicle operator momentarily energizes an "on" switch positioned in the vehicle to connect the source of electrical energy to energizing lines which energize all of the operating components.

When the vehicle operator desires to set a speed at which he wishes to operate the vehicle, he depresses another pushbutton rocker type switch momentarily, as previously described, to set the voltage across the capacitor connected to the control or gate electrode of the high input impedance solid-state amplifier or field-effect transistor.

The vehicle operator may also change the speed setting by movement of the pushbutton rocker type switch in either direction: (1) for increasing the desired or set speed of the vehicle or (2) for reducing the desired or set speed of the vehicle. These actions will change the charge across the capacitor and bring it to a proper voltage value which corresponds to the new desired or set speed. Moreover, upon depression of the on-off pushbutton type rocker switch into the off position, the system will be deenergized and the gate or control electrode of the field-effect transistor or high input impedance solid-state amplifier will be connected to the positive terminal of the source of electrical energy to cutoff conduction of this field-effect transistor or high input impedance solid-state amplifier thereby rendering the remainder of the speed control system inoperative.

The speed control system of the present invention also includes the additional feature of rendering the system inoperative, or disabling it, when the brake pedal of the vehicle is depressed. Circuit means are actuated, on depression of the brake pedal, to connect the positive terminal of the source of electrical energy to the gate electrode or control electrode of the field-effect transistor or high input impedance solid-state amplifier thereby rendering it nonconductive and rendering the speed control system inoperative.

In addition, the speed control system includes a low speed inhibit circuit which will prevent operation of the speed control system if the vehicle is operating at a speed below a certain predetermined speed, for example, 25 m.p.h. The depression of the pushbutton rocker type switch at speeds below 25 m.p.h. will again apply a high positive potential, for example, the potential of the source of electrical energy of the vehicle to the control or gate electrode of the high input impedance solid-state amplifier or field-effect transistor thereby keeping it in a nonconductive state and keeping the reminder of the speed control system in an inoperative condition. In addition, the speed control system includes a large error inhibit circuit which is operative when the actual speed of the vehicle falls below the desired or set speed by a predetermined amount, for example, 10 m.p.h., to shut off the power to the system and thereby disable it.

The above described system provides a very inexpensive, reliable, durable and accurate speed control system which will control closely the speed of the vehicle. It permits the use of electronic and electrical components having wide tolerances in the values of their parameters and thus inexpensive components may be employed that do not need to be selected from production components to have narrow operating tolerances in their parameters. This system also eliminates any need for an adjustment or calibration at the time of assembly, since the speed setting operations and the setting of the voltage across the capacitor described above, that is connected to the gate electrode of the high input impedance or solid-state amplifier or field-effect transistor, is independent of any such calibration. The system also automatically compensates for changes in the parameters of the electronic and electrical components due to temperature and aging.

In addition, the speed control system of the present invention includes circuit means which will latch into conduction and connect the source of electrical energy of the vehicle to power lines that feed the system components upon mere depression momentarily of a rocker type pushbutton switch to the "on" position.

BRIEF DESCRIPTION OF THE DRAWINGS

FIG. 1 is a block diagram of the speed control system of the present invention.

FIG. 2 and 2a show a complete circuit diagram of one embodiment of the speed control system of the present invention.

FIG. 3 is a partial circuit diagram of another embodiment of the speed control system of the present invention.

FIG. 4 is a circuit diagram of still another embodiment of the speed control system of the present invention.

FIG. 5 is a schematic view of an internal combustion engine and showing the power actuator or vacuum motor of the speed control system of the present invention in section.

FIG. 6 is a sectional view through another embodiment of a power actuator or vacuum motor used with the embodiment of the invention shown in FIG. 4.

DESCRIPTION OF THE PREFERRED EMBODIMENTS

Referring now to FIG. 1 there is shown a block diagram of the speed control system of the present invention including a speed sensing circuit 10 comprised of a speed pickup 12, a frequency to voltage converter 14 and a filter 16. The speed pickup 12 may be in the form of a speed sensor that senses the speed of the automotive vehicle in which the speed control system is mounted and produces an output signal having a frequency which is proportional to vehicle speed. This output signal, designated by the letter $f$, is fed to the frequency to voltage converter 14 which produces an output voltage $V_o$ having a DC level which is a function of the frequency of the signal from the speed pickup 12. The magnitude of the voltage $V_o$ is proportional to the frequency of the signal from the speed pickup 12 and may be a linear function of this frequency. The signal $V_o$ from the frequency to voltage converter 14 is then fed to a filter 16 which removes a major portion of the DC ripple from the voltage $V_o$ and produces an output voltage which is proportional to or is a function of the speed of the vehicle. This voltage is designated by the letter $V_s$.

The voltage $V_s$ is then fed to a comparator 18 which compares the voltage $V_s$, the voltage proportional to the actual speed of the vehicle, with a voltage $V_r$ which corresponds to or is a function of the desired or set speed of the vehicle. The voltage $V_r$ is set into a memory 20 via a switch 22 which is connected to receive, through circuits to be described subsequently, a voltage corresponding to the desired speed when the desired speed is substantially equal to the actual speed. Thus the memory 20 stores a voltage that is proportional to or is a function of the desired speed of the vehicle.

The signal $V_r$, that is proportional to or is a function of the desired speed of the vehicle, is then compared in comparator 18 with the signal $V_s$ which is a function of or is proportional to the actual speed of the vehicle to produce a speed error signal $E_s$. The speed error signal $E_s$ is then amplified in an amplifier 24 and applied to a second comparator 26.

The second comparator 26 compares the amplified speed error signal from the amplifier 24 with a feedback voltage $V_t$ which is a voltage having a DC level proportional to or which is a function of the position of the controller means or throttle of the internal combustion engine in the vehicle. The output from the comparator 26 is an actuating error signal $E_a$ which is amplified in an amplifier 28. This amplified actuating error signal is designated as $V_a$. This amplified actuating error signal $V_a$ is then fed to operate the valves 30 which may comprise an atmosphere value and a vacuum value which is connected to a vacuum supply. These valves establish a pressure within a chamber in a servomotor 32 which is in turn is connected to the controller means or throttle of the internal combustion engine of the vehicle.

The voltage $V_\theta$ which is fed to the comparator 26 to develop the actuating error signal $E_a$ is produced by a throttle position transducer 34 which senses the position of the controller means or throttle and produces an output signal which is proportional to or is a function of the controller or throttle position. This voltage increases as the controller or throttle is moved from a closed or idle position to a wide open or full throttle position. As stated above, the servomotor 32 controls the position of the controller or throttle of the internal combustion engine and, therefore, controls the power output of the engine. The road load of the vehicle then acts on the vehicle and its engine so that the vehicle is driven at some speed which is a function of the power output of the engine. The engine and the vehicle is shown as block 36 and the speed pickup 12 will produce, as stated previously, a voltage having a frequency which is proportional to the speed of the vehicle.

Thus, in the speed control system of the present invention there is a major closed feedback loop designated as the SPEED LOOP and a minor closed feedback loop designated as the THROTTLE LOOP.

As will be more specifically explained subsequently, the present invention provides a very reliable, durable and accurate speed control system for controlling the speed of an automotive vehicle in which the actual speed of the vehicle will be controlled to conform within very small limits to a desired or set speed of the vehicle. The minor closed feedback system entitled THROTTLE LOOP, although not essential to the provision of an operative speed control system, assures a close correlation between the actual speed of the vehicle and the desired speed of the vehicle without undue oscillations and hunting effects.

FIGS. 2 and 2a disclose an electronic circuit of one embodiment of the speed control system of the present invention. These two FIGS. disclose the electronic and electrical components making up the speed pickup 12, the frequency to voltage converter 14, the filter 16, the comparator 18, the memory 20, the switch 22, the amplifier 24, the comparator 26, the amplifier 28, the electrically operated portion of the valves 30, and the throttle position transducer 34. Referring now to FIGS. 2 and 2a, there is shown a source of electrical energy 40 comprising an electrical storage battery 42 having one terminal 44, the negative terminal, connected to ground and the other terminal 46, the positive terminal, connected to one terminal of ignition switch 48. The source of electrical energy 40 may also comprise an electrical generator 50 driven by the internal combustion engine of the vehicle in which the speed control system is mounted and having one terminal connected to ground and the other terminal connected to voltage regulator 54. The output of the voltage regulator 54 is connected to the positive terminal 46 of the electrical storage battery 42 and hence to ignition switch 48.

When the ignition switch 48 is closed the positive terminal 46 of the electrical storage battery 42 and the output voltage of the voltage regulator 54 are connected to a line 56. This positive voltage is applied through line 56 to emitter 57 of transistor 58. The base 60 of transistor 58 is connected through resistor 62, line 64, resistor 66, resistor 68, lead 70, resistor 72, line 74 and lead 76 to ground. This permits transistor 58 to switch to its conducting state and current will flow from its collector 78 through diode 80, lead 82, lead 84, resistor 86, diode 88, lead 90 and solenoid winding 92 to grounded line 74. The energization of the solenoid winding 92 closes normally open switch 94, shown in the center right portion of FIG. 2, thereby permitting current flow from collector 78 of transistor 58 through diode 80, diode 96, lead 98, lead 100 lead 102 and the closed switch 94 to the control or gate electrode 104 of a very high input impedance solid-state amplifier 105. This very high input impedance solid-state amplifier may be in the form of a field-effect transistor having an input or gate impedance on the order of $10^{13}$ ohms. Thus, the control electrode 104, which is the gate electrode when the high input impedance amplifier 105 is a field-effect transistor, is connected directly through the output circuit of transistor 58 to the positive terminal voltage of the source of electrical energy 40. This places the control or gate electrode 104 at this potential for purposes which will be described subsequently.

The speed control system of the present invention also includes an on-off rocker switch 110 of the pushbutton type that includes a first conductive blade 112 and a second conductive blade 114. To activate the speed control system of the present invention, the rocker switch 110 is actuated so that the conductive blade 114 is positioned in electrical contact with an "on" terminal 116. This terminal is connected through leads 118, 120 and 122 to the positive terminal of the source of electrical energy 40. This places a positive potential on lead 124, lead 126 and lead 128. Current from the lead 128, therefore, will flow through resistor 68, lead 70 and resistor 72 to ground line 74. This current produces a voltage on the line 70 sufficient to drive current through the base 130 and emitter 132 of transistor 133 thereby switching transistor 133 to its conducting state. Current will then flow from the line 56, which is at the positive potential of the source of electrical energy 40, through lead 134, resistor 136, lead 138, resistor 140, collector 142—emitter 132 circuit of transistor 133 and diode 144 to ground. This action will permit current flow from line 56 through line 134, through the emitter 146 and base 148 of transistor 150 to line 38 to ground through the circuit previously described including the collector 142—emitter 132 circuit of transistor 133. Transistor 150 is thereby switched to its conducting state and current will flow from the collector 152 of transistor 150 through lead 64, junction 154, lead 156 to line 158. Current will also flow from line 64 through resistors 66 and 68, line 70 and resistor 72 to grounded line 74 thereby applying sufficient bias to the base 130 of transistor 133 to latch it to its conducting state, transistor 150 will also be latched into its conducting state. As a result, when the vehicle operator removes the pressure from the pushbutton rocker type switch 110 and conductive blade 114 comes out of contact with "on" contact 116, transistors 133 and 150 will remain in a conducting state. The line 158 will remain energized, therefore, at substantially the terminal voltage of the source of electrical energy 40. It will be appreciated also that at this time the voltage appearing on the line 64 is applied to base 60 of transistor 58. The bias of the emitter 57—base 60 circuit of transistor 58 is insufficient to keep it in a conducting state whereby transistor 58 is switched to its nonconducting state. Solenoid winding 92 is at this time deenergized and switch 94 is opened.

As a result of the above operations, the line 158 is now at substantially the positive voltage of the source of electrical energy 40, and the line 158 furnishes or supplies electrical energy to the components shown. Referring now to the left-hand side of FIG. 2, it will be seen that the line 158 is connected to a series circuit comprising a resistor 160, lead 162, Zener diode 164 and lead 166 and that the lead 166 is connected to a line 168. The line 168 is connected to grounded line 74 through junction 170 and lead 172. Thus, the terminal voltage of the source of electrical energy will appear across the resistor 160 and Zener diode 164. It will be noted that the Zener diode 164 is poled in the reverse direction. It has a Zener breakdown voltage of approximately 10 volts. As a result, a regulated voltage of substantially 10 volts appears on lead 162 and at the junction 174 which is connected to line 176. On the other hand, the raw voltage of the source of electrical energy 40 appears on the line 158.

The speed pickup 12 is shown positioned adjacent the Zener diode 164 and it comprises an electrical generator having an output winding 180 and a rotor 182 which may be of the permanent magnet type having a plurality of magnetic poles positioned about the periphery thereof. This permanent magnet rotor 182 is affixed to the shaft 184 which may be driven by any rotating part of the vehicle which rotates at a speed proportional to vehicle speed. For example, the shaft 184 may be connected to the gear which drives the speedometer cable or it may be positioned in a split speedometer cable in which the shaft 184 transmits rotary motion from a gear positioned in the transmission of the vehicle to the speedometer of the vehicle. The output winding or coil 180 has one terminal thereof connected to line 158 through lead 186, resistor 188 and lead 190. The other terminal of the output winding 180 is connected through lead 192 and resistor 194 to the base 196 of transistor 198. The emitter 200 of transistor 198 is connected to line 168 which, as stated previously, is at ground potential. The collector 202 is connected through lead 204 and resistor 206 to line 176 which is at the regulated voltage of approximately 10 volts. A diode 208 has its anode connected to the junction of lead 186 and resistor 188 and its cathode connected to line 168. Additionally, a filtering capacitor 210 has one terminal connected to the lead 192 and the other terminal connected to the line 168.

A normally conducting transistor 212 has its base 214 connected to lead 204 and hence collector 202 of transistor 198, its emitter 216 connected to line 168 through lead 218 and its collector 220 connected to line 176 through lead 222 and resistor 224. Another transistor 226 has its emitter 228 connected to line 176 through resistor 230 and its collector 232 connected to base 214 of transistor 212 and to the collector 202 of transistor 198. The base 234 of transistor 226 is connected to a junction 236 between the resistor 224 and lead 222 connected to collector 220 of transistor 212. Thus, the base 234 of transistor 226 is directly connected to the collector 220 of transistor 212 and the collector 232 of transistor 226 is connected directly to the base 214 of transistor 212.

The above described components including output winding 180 and rotor 182 of the electrical generator, the transistor 198, the transistor 212 and the transistor 226 may be considered as the speed pickup 12 shown in the block diagram in FIG. 1. The resistor 188 and the diode 208, which may be of the silicon type, provide bias for the transistor 198 and are also connected to compensate for temperature effects. The voltages across the diode 208 and the base 196—emitter 200 junction of transistor 198 track each other as temperature varies, both having substantially the same temperature coefficient. The capacitor 210 filters the high frequency noise present on the leads 186 and 192 of the output winding 180.

The transistor 198 will normally be in a nonconducting state or in a state of very low conduction when the rotor 182 is stationary. Rotation of rotor 182 via shaft 184 which, as stated previously is rotated at a speed proportional to vehicle speed, induces in output winding 180 an alternating voltage having a frequency proportional to vehicle speed. When the voltage on lead 192 is positive it drives the base 196 of transistor 198 positive relative to emitter 200 and turns transistor 198 to a conducting state. On the other hand, when the voltage on lead 192 swings negative it will switch transistor 198 to a nonconducting state by applying a negative voltage to base 196 relative to emitter 200.

Transistor 212 operates as a fast acting switch between its fully nonconducting state and its fully conducting state, and to insure this, it is coupled to transistor 226 as previously described. When transistor 198 is in a nonconducting state, the base 214 of transistor 212 is biased positively with respect to emitter 216 thereby turning transistor 212 to a conducting state. Incipient conduction of transistor 212 causes transistor 226 to conduct heavily thereby supplying large base current to the base 214 of transistor 212 and switching it quickly to its saturated or fully conducting state. On the other hand, when the collector 202 of transistor 198 has a low voltage potential as a result of the conduction of transistor 198, both transistors 212 and 226 are switched regeneratively to their nonconducting states in a very rapid fashion. As a result of the switching of transistor 212 between its fully conducting and its fully nonconducting states because of the switching of transistor 198 between its conducting state and its nonconducting states due to the alternating voltage generated in output winding 180, an essentially square wave voltage will appear at collector 220 of transistor 212 and at the junction 236 between resistor 224 and lead 222.

The frequency to voltage converter 14 comprises a capacitor 240 having one terminal connected to junction 236, the resistor 224 and a diode 242 connected to the other terminal of capacitor 240. The diode 242 is poled to permit current flow into base 244 of transistor 246. The frequency to voltage converter also comprises a diode 248 having its cathode connected to the junction of the capacitor 240 and diode 242 and its anode connected to a junction 250 which in turn is connected to emitter 252 of transistor 246. The collector 254 of transistor 246 is connected to line 158 through lead 256.

The frequency to voltage converter 14 also comprises a resistor 258 and a capacitor 260 connected in parallel between lead 168 and the junction between diode 242 and base 244 of transistor 246. Additionally, it includes resistors 262 and 264 connected in series between the emitter 252 of transistor 246, or junction 250, and line 168.

The capacitor 240 is a charge metering capacitor and the terminal connected to junction 236 swings between the voltage on line 176, approximately 10 volts, and ground or the potential of line 168 as transistor 212 switches between its nonconducting and its conducting states, respectively. The capacitor 260 charges through resistor 224, capacitor 240 and diode 242 from the line 176 each time transistor 212 is switched to its nonconducting state. Capacitor 260 then discharges at a controlled rate through resistor 258. The diode 248 is a "Boot Strap" diode feeding back to the junction between capacitor 240 and diode 242 and hence to the plate of capacitor 240 connected to this junction, a voltage proportional to the voltage across the capacitor 260. As can be noted, the anode of diode 248 is connected to emitter 252 of transistor 246 and this results in a linear frequency to voltage conversion. This is distinct from the normal storage counter in which the anode of diode 248 is connected to ground.

The slope or the proportionality factor of the frequency to voltage curve of frequency converter 14 depends only on the values of capacitor 240 and the resistance of resistor 258 when the capacitance of capacitor 260 is many times greater than the capacitance of capacitor 240. The transistor 246 acts as a buffer amplifier to isolate the frequency to voltage converter from other stages thereby allowing the resistor 258 to be the sole controlling factor in the rate of discharge of capacitor 260.

The filter 16 shown in the block diagram of FIG. 1 comprises a resistor 266 and a capacitor 268 together with a buffer amplifier comprised of transistor 270. The resistor 266 has one terminal connected to junction 250 between emitter 252 of transistor 246 and resistor 262 and the other terminal connected to a junction 272. The junction 272 is connected to the upper plate of capacitor 268 and the lower plate of this capacitor 268 is connected to line 168 and hence to ground. The junction 272 is connected to base 274 of transistor 270, while the collector 276 of transistor 270 is connected to line 176 and the emitter 278 is connected to line 168 and hence to ground through a resistor 280. The filter 16 filters the alternating current components of the frequency to voltage converter output appearing at the junction 250. It will be noted that transistor 270 is connected in an emitter follower figuration to provide high input impedance at its base and a very low output impedance across its emitter to ground terminals. For reasons to be described subsequently, the low output impedance at this point is necessary for proper operation of the complete system.

A low speed inhibit circuit is provided in the speed control system which prevents operation of the system at all speeds below a certain predetermined speed, for example, 25 miles per hour. This low speed inhibits circuit comprises a transistor 282, a resistor 284, the resistors 262 and 264 and a diode 286. The resistor 284 is connected at one terminal to line 158 and at the other terminal to a junction 288. The junction 288 is connected to collector 290 of transistor 282 and through lead 292 to the anode of diode 286. It will be noted that the cathode of diode 286 is connected to lead 102 and switch 94. The base 294 of transistor 282 is connected to the junction between resistors 262 and 264 and the emitter 296 is connected to line 168 and hence to ground through lead 298.

In the operation of the low speed inhibit circuit, at speeds below the predetermined speed, for example, 25 miles per hour, the voltage at junction 250, which is the output of the frequency to voltage converter 14, will be insufficient to drive the requisite current through resistor 262 and the base 294-—emitter 196 circuit of transistor 282 to turn it to its conducting state. As a result, the emitter 290 and the junction 288 are at the potential of line 158 which is the potential of the positive terminal of the source of electrical energy 40. Therefore, when switch 94 is closed for speed setting operations, as will be described subsequently, a circuit is completed from junction 288 through lead 292, diode 286, lead 102 and switch 94 to the gate or control electrode 104 of the high input impedance amplifier or field-effect transistor 105 thereby keeping it in a nonconducting state and rendering the remainder of the speed control system inoperative as will be more fully described subsequently. When the predetermined speed has been obtained or exceeded, for example, speeds in excess of 25 m.p.h., the voltage at the junction 250 is sufficient to drive the requisite current through resistor 262 and base 294—emitter 296 circuit of transistor 282 thereby switching it to a conducting state. As a result, the junction 288 drops to a voltage of about five-tenths of a volt above ground or the potential on line 168 due to the voltage drop across transistor 288. Therefore, when switch 94 is closed, the gate or control electrode 104 of the high impedance input amplifier 105 may be charged to a potential which is a function of the speed of the vehicle as will be described subsequently. The diode 286 will prevent current flow from the control or gate electrode 104 to ground, line 168, through conducting transistor 282.

The memory 20 shown in FIG. 1 comprises the high input impedance solid state amplifier 105 which may be in the form of a field-effect transistor, a capacitor 300, a resistor 302, a capacitor 304 and a resistor 306. The capacitor 300 and resistor 302 are connected in parallel between the line 176 and the source electrode 308 of the field-effect transistor 105. The resistor 306 has one terminal connected to the line 168, which is at ground potential, and the other terminal connected to the drain electrode 310 of the solid-state amplifier of field-effect transistor 105. One terminal and plate of capacitor 304 is connected to a junction 312 positioned between the emitter 278 of transistor 270 and one terminal of the resistor 280. The other terminal and plate of the capacitor 304 is connected to control or gate electrode 104 of the high input impedance solid-state amplifier or field-effect transistor 105. The high input impedance solid state amplifier 105, as stated, may be a field-effect transistor and may be of the enhancement mode, insulated gate metal over oxide type which has a gate input resistance or impedance exceeding $10^{13}$ ohms.

As the gate to ground voltage decreases from the terminal voltage of the source of electrical energy 40, applied when the ignition switch 48 is closed, toward ground, a threshold value is reached at which the field-effect transistor 105 begins to conduct. As this gate voltage decreases further, conduction of field-effect transistor 105 increases thereby increasing the voltage across resistor 306. This voltage is approximately proportional to the source 308—gate 104 voltage of the field effect transistor. When the switch 94 is opened and the adjacent switch 316 is also open, and capacitor 304 has a fixed potential across it, this potential difference will remain substantially invariant with time because of the high gate resistance of field effect transistor 105. Therefore, when the voltage at the left side of capacitor 304 connected to the emitter 278 of transistor 270 is constant, the voltage at gate electrode 104 will remain constant.

When the output voltage of transistor 270 varies as a function of speed so does the gate voltage of the field-effect transistor 105, since capacitor 304 transmits all changes in voltage appearing at the emitter 278 of transistor 270 and across resistor 280 to the gate 104 of field-effect transistor 105. This changes the conduction of field-effect transistor 105 and thus modulates the voltage at its output appearing across resistor 306.

The voltage or potential difference across capacitor 304 is the memory voltage $V_r$ shown in FIG. 1 and is set across the capacitor 304 by means to be described subsequently. The voltage across the resistor 280, that is, the output voltage of transistor 270 is the voltage which is proportional to vehicle speed, $V_s$. The voltage difference $V_s - V_r$, or the speed error signal, $E_s$, shown in FIG. 1 is therefore transmitted to gate or control electrode 104 of high input impedance amplifier or field-effect transistor 105. The capacitor 300 connected to the source electrode 308 permits initial drain current surge immediately following a set speed command to the speed control system to prevent a large speed error from occurring at that time. This operation or set speed command will be described subsequently.

The electrical characteristics of a field-effect transistor which is employed as the high input impedance amplifier 105 are normally temperature dependent, but if such a field-effect transistor is operated at a drain current of some fixed value, the electrical characteristics may remain essentially independent of temperature. To further improve the stability of the field-effect transistor 105 the source resistance 302 is provided. The voltage gain of the field-effect transistor 105 is then given by:

$$A_1 = \frac{-g_m R_{306}}{1 + g_m R_{302}}$$

where $g_m$=transconductance of field-effect transistor 105 and varies between 700 to 1,000 micro-mho.

To make $A_1$ independent of $g_m$, which will vary with the operating point and from unit to unit, the quantity $(g_m R_{302})$ is made very much greater than 1. As a result:

$A_1 = R_{306}/R_{302}$ (approximately)

In an operating speed control system $R_{302}$ may be approximately 5.6K and $R_{306}$ may be approximately 3.3K. The gain of the high input impedance amplifier or field-effect transistor 105 is, therefore, sacrificed to obtain good stability and predictable performance. This approach allows utilization of field-effect transistors having wide tolerances of $g_m$, and it decreases system cost by eliminating the need for selecting field-effect transistors having narrow limits of operating characteristics.

The speed error amplifier 24 shown in FIG. 1 may be considered to be the field-effect transistor 105, plus amplifying transistors 320 and 322. The base 324 of transistor 320 is connected to resistor 306 via junction 326 to receive the voltage output of field-effect transistor 105 which appears across resistor 306. This voltage is in essence the speed error signal $V_s - V_r$ amplified by the field effect transistor 105. The collector 328 and the emitter 332 is connected directly to base 330 of transistor 322 and the emitter 332 is connected to line 168 and hence to ground through resistor 334. The emitter 332 of transistor 320 is also connected through lead 336 and resistor 338 to the collector 340 of transistor 322, and the emitter 342 of transistor 322 is connected to line 176 by a lead 344. The transistors 320 and 322 thereby provide a further amplifying stage for the speed error signal, $E_s$. The voltage gain of the amplifier comprising transistors 320 and 322 has been made independent of temperature and variations in transistor parameters by use of negative feedback through resistor 334 and is given by:

$A_2 \times + R_{338}/R_{334}$

Therefore, the overall gain of the speed error amplifier, that, the gain of the field-effect transistor 105 and the two transistors 320 and 322 is approximately:

$$K_1 = A_1 A_2 = -\left(1 + \frac{R_{335}}{R_{334}}\right)\frac{R_{306}}{R_{302}}$$

The amplified speed error signal appears at junction 346 which is connected to collector 340 of transistor 322. This signal is then applied to a differential amplifier which is the comparator 26 and amplifier 28 shown in FIG. 1. This differential amplifier compares the amplifier speed error signal with a signal $V_\theta$ which is a function of the position of the controller or throttle means of the internal combustion engine of the vehicle in which the speed control system is mounted.

The differential amplifier comprises a first transistor 348, a second transistor 350, a third transistor 352 and a fourth transistor 354. The amplified speed error signal from junction 346 is applied to the base 356 of transistor 348 via resistor 358 and the voltage of signal $V_\theta$ is applied to base 360 of transistor 350. The collector 362 of transistor 248 is connected to line 176 through resistor 364, while collector 366 of transistor 350 is connected to line 158 through resistor 368. The emitter 370 of transistor 348 and the emitter 372 of transistor 350 are connected to the collector 374 of transistor 352 through resistors 376 and 378, respectively. The base 380 of transistor 352 is connected to a junction 382 positioned between resistors 384 and 386 that are connected in series across lines 176 and 168. Additionally, the emitter 388 of transistor 352 is connected to line 168 through resistor 390. The emitter 392 of transistor 354 is connected to collector 362 of transistor 348, while the base 394 is connected through resistor 396 to collector 366 of transistor 350. The collector 398 of transistor 354 is connected to a junction 400 through lead 402.

As stated previously, the differential amplifier compares the amplified speed error signal at the base 356 of transistor 348 with the throttle position feedback voltage $V$ appearing at the base 360 of transistor 350. Differential voltage gain is determined by the ratio of $R_{364}/R_{376}$ or $R_{368}/R_{378}$. The amplifier is symmetrical and is made so by making $R_{364}$ equal to $R_{368}$ and $R_{376}$ equal to $R_{378}$. The difference between the collector 362 voltage of transistor 348 and the collector 366 voltage of transistor 350 is the actuating error signal $E_a$ as shown in FIG. 1 and is sensed by applying the voltage at collector 362 of transistor 348 to emitter 392 of transistor 354 and by applying the collector voltage at collector 366 of transistor 350 to the base 394 of transistor 354. An amplified actuating error signal appears therefore at the collector 398 of transistor 354 and at the junction 400. This voltage is the amplified actuating error signal, $V_a$, shown in FIG. 1.

The transistor 352 together with resistors 384, 386 and 390 form a constant current source for the transistors 348 and 350 and is necessary to achieve high common mode signal rejection. Common mode signals are those which are applied to the differential amplifier in phase and include variations in the voltage appearing on line 158, noise, temperature effects, etc. High common mode rejection makes the output of transistor 354 and hence the amplified actuating error signal $V_\theta$ largely insensitive to these extraneous signals. A filtering network comprised of resistor 404 and capacitor 406 is connected across lines 158 and 168 and junction 400 is positioned between them, as well as, a junction 408. This network filters additional noise and unwanted alternating current voltage from the throttle position transducer 34 shown in FIG. 1 thereby allowing a substantially clean amplifier actuating error signal $V_a$ at the junction 400 and 408.

The amplified actuating error signal is applied to the input circuits of a first Darlington amplifier 410 and a second Darlington amplifier 412. The Darlington amplifier 410 comprises a first transistor 414 having its emitter 416 connected to line 158, its collector 418 connected to a line 420 which in turn is connected to one terminal of a solenoid 422. The other terminal of the solenoid 422 is connected to line 168 or ground. The base 424 of transistor 414 is connected to emitter 426 of the second transistor 428. The collector 430 of the second transistor 428 is connected to line 420 and hence to collector 418 of transistor 414, and the base 432 is connected through resistor 434 to junction 400 so that the base 432 receives the amplified actuating error signal $V_a$.

The second Darlington amplifier 412 also includes a first transistor 440 having its emitter 442 connected to line 158 through a pair of series connected diodes 444 and 446. The collector 448 of transistor 440 is connected through leads 450, 452 and 454 to one terminal of a second solenoid or winding 456. The other terminal of this solenoid or winding is connected to line 168 and hence to ground through leads 458 and 460. The base 462 of transistor 440 is connected to emitter 464 of the second transistor 466, and the collector 468 of this transistor is connected to lead 450 and collector 448 of transistor 440. The base 470 of transistor 466 is connected through resistor 472 to the junctions 408 and 400 to receive the amplified actuating error signal $V_a$.

As will be explained more fully subsequently, when transistor 414 of Darlington amplifier 410 is in the conducting state, current flows through the emitter 416—collector 418 circuit of this transistor, through lead 420 and through solenoid or winding 422. Similarly, when transistor 440 of Darlington amplifier 412 is in the conducting state, current flows through diodes 444 and 446, the emitter 442—collector 448 circuit of transistor 440, lead 450, lead 452 and solenoid 456. A commutating diode 480 is connected across solenoid or winding 422, and a commutating diode 482 is connected across solenoid or winding 456 to permit continued current flow when the transistors 414 and 440 respectively are switched to their nonconducting state.

The throttle position transducer 34, shown in block diagram form in FIG. 1, comprises a solid-state active device 484 connected to a tank circuit 486 to form an oscillator. The tank circuit 486 includes a center tapped inductive element 488 connected in parallel with capacitor 490. The solid-state active device 484 may be a field-effect transistor of the junction type having its drain electrode 492 connected to line 176 through resistor 494, its source electrode 496 connected to a center tap terminal 498 on inductive element 488 through a resistor 500, connected in parallel with a temperature compensating thermistor 501, and through a variable compensating resistor 502. The gate electrode 503 is connected to one end terminal 505 of inductive element 488 and thus to the tank circuit 486. The other end terminal 505 of the inductive element 488 is connected to lead 458 and hence to ground by the solid-state active device 484 and the tank circuit 486 having an output voltage that appears on line 506. This output voltage is rectified by diode 507, filtered by resistor 508 and capacitor 509 and applied to the base 510 of an amplifying transistor 511. The collector 512 of transistor 511 is connected to line 158 and its emitter 513 is connected to line 168 and hence ground through resistor 514. The output voltage appearing across resistor 514 and at the collector 513 is applied through lead 515, lead 516 and resistors 517 to the base 360 of transistor 350 of the differential amplifier. This voltage appearing at the emitter 513 and across resistor 514 and applied to the base 360 of transistor 350 of the differential amplifier is the voltage which is proportional to the position of the controller of throttle of the vehicle and is denoted by the symbol $V_\theta$ in FIG. 1.

The throttle position transducer 34 is fully described and claimed in copending application Ser. No. 781,183, filed Dec. 4, 1968 in the name of Bernard G. Radin and assigned to the assignee of this invention. As disclosed in that application, it provides the voltage $V_\theta$ which is a function of and may be proportional to the position of the throttle or controller means of the vehicle. This throttle or controller or means is controlled by the servomotor 32 shown in FIG. 1. This servomotor together with its actuating valves and a portion of internal combustion engine utilizing the speed control system of the present invention is shown in FIG. 5. Additionally, the solenoids or windings 422 and 456 are the windings of the atmosphere valve and the vacuum valve respectively shown on this FIG. and denoted by the block 30 entitles "VALVES" in FIG. 1.

In FIG. 5 there is shown an internal combustion engine 520 having an air intake means 522 which may be part of a carburetor mounted on the internal combustion engine 520. The carburetor has a movable controller means 524 which may be in the form of a carburetor throttle plate pivotally mounted for rotation about a pivot 526. The controller means or throttle plate 524 may be conventionally connected to an accelerator pedal 528 through a conventional linkage system 530 comprising arm 532, link 534, link 535, link 536 and link 538. The accelerator pedal may be pivotally mounted at 540 to the floor board 542 of the vehicle.

The controller means or throttle plate 524 is biased to its closed position by means of a tension spring 544 having one end thereof affixed to link 534. When the accelerator pedal 528 is depressed, the controller means or throttle plate 524 will be rotated counterclockwise, as shown in FIG. 5 toward its open position through the linkage means 530 to provide more fuel-air mixture for the internal combustion engine 520 and thus increasing its speed. A drive shaft 546 from the internal combustion engine 520 may be connected to the driving wheels of the automotive vehicle through a conventional transmission and driveline. The link 534 and hence the controller means 524 or carburetor throttle is also connected to a diaphragm 548 of the servomotor, in the form of a vacuum motor or power actuator 32, through a suitable chain-type connector 552.

As more fully described in copending application Ser. No. 781,170, filed Dec. 4, 1970 in the name of Gary F. Woodward and assigned to the assignee of the present invention and in application Ser. No. 781,183, filed Dec. 4, 1968 in the name of Bernard G. Radin and assigned to the assignee of the present invention, the servo or vacuum motor 32 comprises a housing 554 having a first cup-shaped portion 556 and a second cup-shaped portion 558 constructed of a plastic insulating material. The diaphragm 548 is constructed of a flexible elastomeric material and has its outer periphery trapped or fixed between the flanges formed on the cup-shaped portions 556 and 558 of the housing 554. The main body portion 560 of the diaphragm 548 is positioned between an outer metallic plate 562 and an inner metallic plate 564 by a plurality of rivets 566. These rivets also affix the main body portion 560 to a hook member 568 that receives the other end of the chainlike connecting member 552.

The cup-shaped portion 556 of the housing includes an end wall 569 having a central aperture 570 positioned therein so that atmospheric pressure may be applied to the side of the diaphragm 548 that is positioned against the outer plate 562.

The other cup-shaped portion 558 has an end wall 572 positioned in generally spaced parallel relationship with respect to the end wall 569. This end wall 572 has a pair of spaced threaded bores 574 and 576 that receive a normally closed vacuum valve 578 and a normally open atmospheric valve 580. These two valves are conventional in construction and each includes a ferromagnetic shuttle or valve member 582, each of which is controlled by a solenoid or winding. The solenoid or winding for the vacuum valve 578 is the solenoid or winding 456 shown in FIG. 2a which is connected to be energized by the Darlington amplifier 412. The solenoid or winding for the atmosphere valve 580 is the solenoid or winding 422 shown in FIG. 2a which is connected to be energized by the Darlington amplifier 410.

The shuttle or valve member 582 of the vacuum valve 578 is spring biased by a spring 586 to cover the end of conduit 588. The valve member or shuttle 582 is fluted so that fluid may flow through the valve when winding 456 is actuated sufficiently to move valve member or shuttle 582 to the left as shown in FIG. 5 to uncover the conduit 588. Conduit 588 is connected to a vacuum accumulator or supply 590 which is denoted in the block diagram of FIG. 1 by the words "VACUUM SUPPLY." The vacuum accumulator or supply 590 may be suitably connected through a conduit 592 and a check valve 594 to the intake manifold of the internal combustion engine 520.

On the other hand, the atmospheric valve 580 is in a normally open position as shown so that atmospheric pressure may force air through a filter 596 into chamber 598 that is formed by the cup-shaped portion 558 of the housing 554 and the diaphragm 548.

The end wall 572 of the cup-shaped portion 558 of the housing 554 has a protuberance 600 communicating with the chamber 598 and essentially forming part of it. This protuberance 600 has an axially extending opening 602 positioned therein and a closing end wall 604.

A movable means 606 in the form of a metallic slug (preferably constructed of ferromagnetic material) extends into the opening 602. The movable means 606 has an enlarged end portion 608, a central generally tapered portion 610 and a radial extending flange 612 positioned opposite the end 608. A helical compression spring 614 has one end positioned against the end wall 572 and the other end positioned against radially extending flange 612 of the movable means 606. The radially extending flange 612 is positioned against inner cup-shaped plate 564 so that compression spring 614 forces outer plate 562 into engagement with end wall 569 of cup-shaped portion 556. As a result, the diaphragm 548 and the movable means 606 will be positioned as shown in FIG. 5 when the speed control system of the present invention is in its operative or unactuated state.

The inductive element 488 in the form of a coil or winding shown in FIG. 2a is positioned about the protuberance 600 and against the end wall 572. Thus when the diaphragm 548 is in the position shown in FIG. 5 the enlarged end portion 608 of the movable means 606 is positioned within the central opening in the inductive element 488.

As will be explained more fully subsequently, when the speed control system of the present invention is operative and the diaphragm 548 moves to the right into the dotted line position as shown in FIG. 5, it moves the controller means or throttle plate 524 into alignment with the more vertical line defining the angle $\theta$. When the diaphragm 548 is in the dotted line position, the movable means 606 will also move into the dotted line position. When this happens the throttle means 524 is at the full throttle position and the accelerator pedal 528 is in a depressed position. It should also be noted that the tapered portion 610 of the movable means 606 is now positioned within the central opening in the inductive element 488 of the tank circuit 486 of the throttle position transducer 34. As fully explained in the copending application mentioned above filed in the name of Bernard G. Radin, the output from the throttle position transducer 34 will decrease as the controller 524, the diaphragm 548 and the movable means 606 move from their solid line to their dotted line positions. This output voltage, $V_\theta$, applied to the base 360 of transistor 350, is a function of the angle $\theta$ shown in FIG. 5 and the position of the diaphragm 548. It will increase as a function of the increasing angle $\theta$ or the increasing opening of the throttle or controller means 524, thereby providing a feedback voltage which increases as a function of controller or throttle position. The theory and the mechanism behind this is fully explained and disclosed in the copending application mentioned above filed in the name of Bernard G. Radin.

As stated above in relation to FIGS. 2 and 2a, when ignition switch 48 is closed, transistor 58 is switched to a conducting state thereby permitting current flow through the solenoid or winding 92 from the collector 78 via diode 80, lead 82, lead 84, resistor 86, diode 88 and line 90. This closes switch 94 and applies the positive potential of the source of electrical energy 40 to the control or gate electrode 104 of the solid-state amplifier or field-effect transistor 105. This voltage is applied to the controller gate electrode 104 from the collector of transistor 58 via diode 80, diode 96, lead 98, lead 100, lead 102 and closed switch 94. This insures that the solid-state amplifier or field-effect transistor 105 is in a nonconducting state so that the speed control system is inoperative.

It was also stated above that when the on-off pushbutton rocker switch 110 is depressed so that the blade 114 comes into engagement with "on" contact 116, transistor 133 and transistor 150 are switched to a conducting state. As a result, transistor 58 is switched to a nonconducting state and line 158 is energized at a potential substantially equal to the positive terminal voltage of the source of electrical energy 40 from the collector 152 of transistor 150 via lead 64, junction 154 and lead 156. When the pushbutton rocker switch 110 is released so that blade 114 comes out of contact with contact 116, transistor 133 remains in its conductive state because of the current through resistors 66, 68, and 72. This also keeps transistor 150 in its conducting state.

The vehicle operator may deenergize the speed control system by moving the movable blade 112 of pushbutton rocker switch 110 into contact with "off" contact 177 which is connected to ground through lead 179. This action grounds the line 128 and therefore connects base 130 of transistor 133 to ground through lead 70 and resistor 68 thereby switching transistor 133 to a nonconducting state. Switching of transistor 133 to a nonconducting state. Switching of transistor 133 to a nonconducting state removes the path for current from base 148 of transistor 150 and switches it to a nonconducting state. This deenergizes the line 64 which is connected to line 158 through line 156 and deenergizes this line and the remainder of the system. Since the ignition switch 48 is closed, transistor 58 will again come into conduction as explained above. Current will flow through winding 92 to close switch 94 and the high positive potential equal to the terminal voltage of the source of electrical energy 40 will again be applied to the gate 104 of solid-state amplifier or field-effect transistor 105 through diode 80, diode 96, lead 98, lead 100, lead 102 and closed switch 94 to cutoff conduction of solid-state amplifier or field-effect transistor 105 and render the system inoperative.

If it is assumed that the speed control system is in the condition in which ignition switch 48 has been closed and the pushbutton rocker switch 110 has been moved temporarily so that blade 114 comes into contact with "on" contact 116, the line 158 will be energized at a voltage equal to the positive potential of electrical energy 40 and the line 176 will be energized at a regulated potential equal to breakdown voltage of the Zener diode 164, i.e., approximately 10 volts.

At this time the automotive vehicle internal combustion engine 520 will have been started and the vehicle operator will have depressed accelerator pedal 528 to open the controller or the throttle means 524 to propel the automotive vehicle at a given speed. However, the windings or solenoids 456 and 422 that operate the vacuum valve and the atmosphere valve 578 and 580, respectively, will e unenergized since field-effect transistor 105, transistors 320, 322, 348 and 354 and Darlington amplifiers 410 and 412 will all be in a nonconducting state. Therefore, the vacuum motor or actuator 32 will be in the position shown in FIG. 1 and the chain connector 552 will be in a loose condition. In order to actuate the speed control system of the present invention and provide a speed setting that will be maintained by the automotive vehicle, there is provided a combined coast set and acceleration set pushbutton rocker switch 620 as shown in FIG. 2. This switch has two opposed blades 622 and 624 connected at 626 to a lead 628. This lead in turn is connected to the lead 128. The switch 620 also includes a coast set contact 630 connected to ground through lead 632 and resistor 634 and an acceleration set contact 636 connected to ground through lead 638 and resistor 640. Movement of blade 622 into contact with contact 630 connects lead 628 and lead 128 to ground through the resistor 634. Connecting the lead 128 to ground will connect the base 642 of transistor 644 to ground through resistor 646, lead 648, junction 650, lead 652 and lead 128. The emitter 654 of transistor 644 is connected to line 64 which is energized at the positive potential of the source of electrical energy 40, and the collector 656 is connected through diode 658 to one terminal or plate of capacitor 660. The other terminal or plate of the capacitor 660 is connected to a junction 662 which in turn is connected to the upper terminal of the winding or solenoid 92. Switching of the transistor 644 to the conducting state sends a pulse through capacitor 660 from the collector 656 via diode 658 to the winding 92 to momentarily close switch 94 connected to gate electrode 104 of the high input impedance amplifier or field-effect transistor 105.

When transistor 644 is switched to its conducting state current will also flow from its collector 656 via lead 664 to emitter 666 of transistor 668. Since the base 670 of transistor 668 is connected to ground through resistor 672, lead 674, lead 678 and solenoid 680, transistor 686 will also be switched to a conducting state. The collector 682 of transistor 668 is connected through lead 684, diode 686 and lead 688 to line 100 thereby applying the positive potential on line 64, through transistor 644, transistor 668, lead 684, diode 686, lead 688, lead 100, lead 102 and closed switch 94 to the control or gate electrode 104 of solid-state amplifier or field-effect transistor 105. This insures that field-effect transistor 105 is maintained in its nonconductive state.

When the coast set and acceleration set switch 620 is released by the vehicle operator, it will open thereby switching transistor 644 to a nonconductive state. Switching of transistor 644 to a nonconducting state also switches transistor 668 to a nonconducting state thereby disconnecting line 100 from the lead 64 and the positive terminal of the source of electrical energy 40. It will be remembered that when transistor 644 was switched to its conducting state, it charged capacitor 660 through diode 658. This capacitor will now discharge through lead 690, diode 692, resistor 694 and winding 92. Switch 94 at this time is in the open position because capacitor 660 has been charged to its fully charged condition thereby cutting off current flow through winding 92. Capacitor 660 now discharges through the circuit described above, including winding 92, and the switch 94 will now close thereby connecting the control or gate electrode 104 of solid-state amplifier or field-effect transistor 105 to line 100.

The line 100 is connected through junction 700, resistor 702, diode 704, lead 706, lead 454, solenoid or winding 456 of the vacuum valve 578, lead 458 and lead 460 to line 168 which is at ground potential. This lowers the voltage on the control or gate electrode 104, and the plate of capacitor 304 connected to it, to a level where the solid-state amplifier or field-effect transistor 105 commences to conduct. This switches transistor 320 and transistor 322 into their conducting states and applies a positive potential at the base 356 of transistor 348 of the differential amplifier.

It will be remembered that the throttle position transducer 34 comprised of field-effect transistor 484 and tank circuit 486 is, during this period, producing oscillations of a minimum amplitude which are rectified, amplified and then applied to the base 360 of transistor 350 of the differential amplifier. The voltage on the gate or control electrode 104 continues to decrease and the conduction of the solid-state amplifier or field-effect transistor 105 continues to increase thereby causing transistor 348 to go into a conducting state and causing transistor 354 to go into a heavily conducting state.

The output of transistor 354 is applied to the Darlington amplifiers 410 and 412 and this output will switch both of these Darlington amplifiers to their conductive states thereby energizing both the solenoids or windings 456 and 422 of the vacuum valve 578 and the atmosphere valve 580, respectively. When the Darlington amplifier 412 is switched to its conducting state, the diode 704 becomes back biased and it, therefore, prevents further discharge of the plate of capacitor 304 connected to control or gate electrode 104 of solid-state amplifier or field-effect transistor 105 since current may no longer flow through closed switch 94, lead 102, lead 100, junction 700 and resistor 702. Energization of the windings or solenoids 422 and 456 will close the atmosphere valve 422 and will open the vacuum valve 578 thereby applying a high vacuum in the chamber 598 of the vacuum motor or actuator 32. This moves the diaphragm 548 to the right into a position where it tightens the chainlike connector 552 which has been loosened due to the depression of the accelerator pedal 528, and the movement of the link 534 to the right when the controller or throttle means 524 is rotated toward its open position by the vehicle operator. Movement of the diaphragm 548 to the right will cause movement of the movable means 606, preferably constructed of ferromagnetic material, to the right as shown in FIG. 5. This raises the output voltage $V_\theta$ of the throttle position transducer comprised of transistor 484 and tank circuit 486 that is applied to the base 360 of transistor 350. A balance in the conduction of transistors 348 and 350 will then occur and the vacuum motor 32 is set in position to maintain the speed of the vehicle at the speed it was when the pushbutton rocker-type switch 620 was depressed.

The energization of the winding 92 by the discharge of the capacitor 660 will be momentary and will keep switch 94 closed until the above-described operation has been completed. When current flow through winding 92 is no longer sufficient to keep switch 94 closed, it will open and a voltage $V_r$ will appear across the capacitor 304 which is a voltage proportional to the set or desired speed of the vehicle. It will be remembered that the voltage $V_n$, proportional to the actual speed of the vehicle, appears across the resistor 280 from the frequency to voltage converter 14 and will vary with vehicle speed. However, the voltage across the plates of the capacitor 304 cannot vary since the plate of the capacitor 304 connected to the control or gate electrode 104 sees the very high input impedance of solid-state amplifier or field-effect transistor 105, i.e., on the order of $10^{13}$ ohms.

The above-described speed setting operation will occur only if transistor 282 is in its conducting state. As mentioned previously, this transistor goes into its conducting state. As mentioned previously, this transistor goes into its conducting state when the vehicle is operating at a speed above a predetermined speed, for example, 25 m.p.h. If the speed of the vehicle is below this predetermined speed, transistor 282 will be in a nonconducting state; and when the rocker-type pushbutton switch 620 is operated and switch 94 is closed, a high positive potential will be applied to the gate 104 of the solid-state amplifier or field-effect transistor 105 from line 158 through resistor 284, junction 288, lead 292, diode 286, lead 102 and closed switch 94. This keeps the solid-state amplifier or field-effect transistor 105 in a nonconducting state and keeps the speed control system deenergized when the vehicle is operating below the predetermined speed, for example, 25 m.p.h.

The vehicle operator may also set the vehicle to operate at a set or desired speed by operating the pushbutton rocker switch 620 to bring the conductive blade 624 into contact with contact 636. This grounds the line 128 through lead 628, conductive blade 624, contact 636, lead 638 and resistor 640. The resistor 640 is approximately four times as small as resistor 634 and as a result, transistor 740 shown on FIG. 2a and located to the right of transistor 668 will be switched to its conducting state. It will be noted that the emitter 742 of transistor 740 is connected to line 64 through lead 744, while the base 746 is connected through resistor 748 to junction 750. A resistor 752 is connected between lead 64 and junction 750, while junction 750 is connected through lead 754 to lead 128. The collector 756 of transistor 740 is connected through lead 758 and lead 678 to winding or solenoid 680 that controls the opening and closing of switch 316 connected to the gate or control electrode 104 of solid-state amplifier or field-effect transistor 105.

The resistor 640 is sufficiently small to permit sufficient current flow through resistor 752 to drop the base 746 of transistor 740 to a point where transistor 740 will be switched to its conducting state. Simultaneously, the transistor 644 is switched to its conducting state, since its base is also grounded through resistor 646, lead 648, lead 652 and lead 128. Thus both transistors 644 and 740 are switched to their conducting states. The transistor 668 will remain, however, in its nonconducting state since its emitter 660 is tied to the collector 656 of conducting transistor 644 and its base 670 is tied to the collector 756 of conducting transistor 740. The switching of transistor 644 to its conducting state sends a pulse through diode 658 and capacitor 660 causing current flow through solenoid or winding 92 thereby closing switch 94.

The switching of transistor 740 to its conducting state sends current through solenoid or winding 680 from collector 756 via lead 758 and lead 678. This closes switch 316 connected to the control or gate electrode 104 of solid-state amplifier or field-effect transistor 105. The switch 316 will remain closed as long as transistor 740 is in its conducting state and as long as the blade 624 of switch 620 is positioned in contact with acceleration set contact 636. Switch 94 will open, however, as soon as capacitor 660 has been charged to its fully charged state through transistor 644, since current no longer flows through solenoid or winding 92. With switch 316 closed the plate of capacitor 304 connected to control or gate electrode 104 of the solid-state amplifier or field-effect transistor 105 will discharge from the voltage equal to the positive voltage of the source of electrical energy 40 through lead 770, closed switch 316, resistor 772, lead 774, lead 292 and the low impedance of collector 290—emitter 292 circuit of transistor 282 which is in a heavily conducting state. This lowers the voltage on the gate or control electrode 104 and conduction of the solid-state amplifier or field-effect transistor 105 thereby causing conduction of transistors 320, 322, 348 and 354. This action causes Darlington amplifier 412 to come into its conducting state and energizes vacuum valve solenoid or winding 456 thereby connecting the chamber 598 of the servomotor or vacuum actuator 32 to the source of vacuum supply 590 through the open vacuum valve 578.

When the speed of the vehicle reaches a speed desired by the vehicle operator, he releases the pushbutton rocker-type switch 620 thereby breaking the engagement of conductive blade 624 with the acceleration set contact 636. This immediately switches transistors 644 and 740 to their nonconducting states. Switching or transistor 740 to its nonconducting state deenergizes solenoid or winding 680 thereby opening switch 316 connected to the control or gate electrode 104 of the solid-state amplifier or field-effect transistor 105 and preventing further discharge of capacitor 304. It will be remembered that capacitor 660 connected to collector 656 of transistor 644 has been fully charged by the conduction of transistor 644 an solenoid or winding 92 had been deenergized thereby opening switch 94. When transistor 644 is switched to its nonconducting state, capacitor 660 discharges through winding 92 and the circuits previously described thereby momentarily closing switch 94 and connecting the control or gate electrode of solid-state amplifier or field-effect transistor 105 to ground through the previously described circuit of closed switch 94, lead 102, lead 100, junction 700, resistor 702, diode 704, lead 706, lead 454, solenoid or winding 456, lead 458, lead 460 and line 168. If the Darlington amplifier 412 is in its conducting state at the time switch 94 is closed, the diode 704 will be back biased and no further discharge of the capacitor 304 will take place. If on the other hand, the Darlington amplifier 412 is in its nonconducting state, the capacitor 304 will discharge further until such time as the Darlington amplifier 412 commences to conduct. At this time the diode 704 will become back biased and further discharge of the capacitor 304 will be terminated thereby setting the new voltage $V_r$, which is representative of the desired or set speed of the vehicle, across the capacitor 304. As soon as capacitor 660 has been discharged through winding 92, switch 94 will open and the voltage across capacitor 304 will be stabilized.

When the actual speed of the vehicle is equal to the set or desired speed, the transistor 354 of the differential amplifier 26—28 will be in a conducting state sufficient to keep the Darlington amplifier 410 in a conducting state and sufficient current will flow through solenoid or winding 422 of atmosphere valve 580 to keep this valve closed. On the other hand, due to the diodes 444 and 446 positioned in the emitter circuit of transistor 440 and resistor 472 positioned in the base circuit of transistor 466, the Darlington amplifier 412 will be in a nonconducting state thereby keeping the normally closed vacuum valve 518 closed since winding or solenoid 456 is not energized.

If the actual speed of the vehicle decreases below the set or desired speed, the voltage appearing at the control electrode or gate electrode 104 of the solid-state amplifier or field-effect transistor 105 will decrease since the frequency to voltage converter 14 will have a decreased output appearing across resistor 280 at junction 312 connected to the left-hand plate of capacitor 304. This decreased voltage will be transmitted directly across the plate of capacitor 304 to the gate or control electrode 104. This causes the solid-state amplifier or field-effect transistor 105 and transistors 320, 322, and 348 to increase in conduction and thereby causes transistor 354 to increase its conduction. This increase in conduction will not affect Darlington amplifier 410 since it is already in its conducting state. This energizes solenoid or winding 456 of vacuum valve 578 thereby decreasing the pressure in the chamber 598 and moving diaphragm 548 and movable means 606 further to the right as shown in FIG. 5. This action will further open the throttle or controller means 524 and increase the angle $\theta$. The speed of the vehicle will, therefore, increase and the output from the throttle position transducer 34 will increase. This increases the voltage supplied to the base 360 of transistor 350 of differential amplifier 26—28 causing voltage conduction of this transistor. This will lower the voltage at the base 394 of transistor 354 and bring it back to its previous level of conduction when the actual speed of the vehicle equals the desired or set speed of the vehicle. This action will switch the Darlington amplifier 412 to its nonconducting state thereby deenergizing the solenoid or winding 456 of vacuum valve 578 and sealing the chamber 598. This occurs when the actual speed of the vehicle equals the desired or set speed.

If the actual speed of the vehicle exceeds the set or desired speed, for example, when the vehicle is traveling on a descending grade, the voltage appearing across the resistor 280 and at the junction 312 from the frequency to voltage converter 14 will increase. This increase in voltage is transmitted across capacitor 304 to the control or gate electrode 104 of solid-state amplifier or field-effect transistor 105. As a result, transistors 320, 322 and 348 will decrease in conduction thereby decreasing the conduction of transistor 354. The decrease in conduction of transistor 354 will switch the Darlington amplifier 410 into a nonconducting state thereby deenergizing the solenoid or winding 422 of atmosphere valve 580. The Darlington amplifier 412 was, when the actual speed of the vehicle equaled the desired or set speed, in a nonconducting state and the decrease in conduction of transistor 354 will not affect it and will keep it in a nonconducting state. Therefore, both the vacuum valve solenoid or winding 456 and the atmosphere vacuum valve solenoid or winding 422 are deenergized. The vacuum valve 578, therefore, remains closed and the atmosphere valve 580 opens. This increases the pressure in chamber 598 of the servomotor of vacuum actuator 32, thereby permitting the tension spring 544 to move the diaphragm 548 to the left through the chain type connection 552 shown in FIG. 5. This also moves the controller means or throttle 524 toward its closed position and decreases the angle $\theta$. Simultaneously, the movable means 606 will move to the left thereby decreasing the output voltage of the throttle position transducer 34.

The decrease in the output voltage of throttle position transducer 34 will be applied to the base 360 of transducer 350 thereby decreasing its conduction and raising the voltage at the base 394 of transistor 354. This will increase the conduction of transistor 354 to the point where it will switch the Darlington amplifier 410 into its conducting state, thereby energizing solenoid or winding 422 of atmosphere valve 580 and closing this valve. This operation decreases the actual speed of the vehicle to a value equal to the set or desired speed and balances the speed control system.

In actual operation, it has been noted that the ripple in the output of the frequency to voltage converter 14 is actually transmitted throughout the system and that solenoids or windings 422 and 456 are actually pulsed, but that the average current through them accomplishes the above described action.

In the speed control system of the present invention, if the vehicle operator is traveling at some set speed and desires to change this speed, he may do so readily by merely actuating the pushbutton rocker type switch 620 in either direction. For example, if he wishes to decrease the set or desired speed, he depresses the pushbutton rocker switch 620 so that the blade 622 comes in contact with contact 630. This grounds the line 128 through resistor 634 thereby switching transistors 644 and 668 to their conducting states a previously described during the speed setting operation. The energization of transistor 644 sends a pulse through winding 92 via diode 658 and capacitor 660 as previously explained, thereby closing switch 94. With transistors 644 and 688 conducting, a potential substantially equal to the positive potential of the source of electrical energy 40 will appear on line 100 and will be transmitted to the gate electrode 104 of the solid-state amplifier or field-effect transistor 105 thereby switching it to its nonconducting state and deenergizing the remainder of the speed control system. When the lower desired speed of the vehicle is reached, the vehicle operator releases the switch 620 thereby breaking the contact between the movable blade 622 and contact 630. This switches transistor 644 and transistor 668 to their nonconducting states and the speed setting operation described above will repeat, that is, the switch 94, which has been opened due to the charging of the capacitor 660 to its fully charged state and the cutting off of current flow through winding 92, will again be closed momentarily due to the discharge of capacitor 660 through winding 92. This connects the gate electrode 104 of solid-state amplifier or field-effect transistor 105 through closed switch 94, lead 102, lead 100, junction 700, resistor 702 and diode 704 to the terminal of solenoid or winding 456 of the vacuum valve 578 and hence to ground to leads 458, 460 and line 168. The speed setting operation will then be completed, the differential amplifier will come into a balanced condition and the switch 94 will open to thereby set a new voltage $V_r$ across capacitor 304 connected to the gate electrode 104 of solid-state amplifier or field-effect transistor which corresponds to the new desired or set speed.

If on the other hand, the vehicle operator is traveling at some set speed and he desires to increase this speed, he may do so readily by merely actuating the pushbutton rocker type switch 620 so that blade 624 comes into contact with contact 636. This grounds the line 128 through lead 628, conductive blade 624, contact 636, lead 638 and resistor 640 thereby switching transistors 644 and 740 to their conductive states as previously described during the speed setting operation. The switching of transistor 740 to its conducting state sends current through solenoid or winding 680 thereby closing switch 316 connected to the control or gate electrode 104 of solid-state amplifier or field-effect transistor 105. The switch 316 will remain closed as long as transistor 740 is in its conducting state and as long as blade 624 of switch 620 is positioned in contact with acceleration set contact 636. As stated previously, upon initial conduction of transistor 644 a pulse of current will flow through winding 92 thereby momentarily closing the switch 94. This switch, however, will open as soon as capacitor 660 is fully charged.

With switch 316 closed, the plate of capacitor 304 connected to control or gate electrode 104 of the solid-state amplifier or field-effect transistor 105 will discharge from its previously set voltage through lead 770, closed switch 316, resistor 772, lead 774, lead 292 and the low impedance of the collector 290—emitter 292 circuit of transistor 282 which is in a heavily conducting state. This lowers the voltage on the gate or control electrode 104 and increases the conduction of the solid-state amplifier or field-effect transistor 105 thereby increasing conduction of transistors 320, 322, 348 and 354. This action causes Darlington amplifier 412 to come into its conducting state and energizes vacuum valve solenoid or winding 456 thereby connecting chamber 598 of the servomotor or vacuum actuator 32 to the source of vacuum supply 590 through the open vacuum valve 578.

When the speed of the vehicle reaches the speed desired by the vehicle operator, he releases the pushbutton rocker switch 620 thereby breaking the engagement of conductive blade 624 with the acceleration set contact 636. This immediately switches transistors 644 and 740 to their nonconducting states. Switching of transistor 740 to its nonconducting state deenergizes solenoid or winding 680 thereby opening switch 316 connected to the control or gate electrode 104 of the solid-state amplifier or field-effect transistor 105 and preventing further discharge of capacitor 304.

Discharge of capacitor 660 will now take place, i.e., discharge through winding 92 via the circuits previously described, thereby momentarily closing switch 94 and connecting the control or gate electrode of solid-state amplifier or field-effect transistor 105 to ground through the previously described circuit of closed switch 92, lead 102, lead 100, junction 700, resistor 702, diode 704, lead 706, lead 454, solenoid or winding 456, lead 458, lead 460 and line 168. If the Darlington amplifier 412 is in its conducting state at the time switch 94 is closed, the diode 704 will be back biased and no further discharge of the capacitor 304 will take place. If on the other hand, the Darlington amplifier 412 is in its nonconducting state, the capacitor 304 will discharge further until such time as the Darling amplifier 412 commences to conduct. At this time the diode 704 will become back biased and further discharge of the capacitor 304 will be terminated thereby setting the new voltage, $V_r$, which is representative of the new desired or set speed of the vehicle, across capacitor 304. As soon as capacitor 660 has been discharged through winding 92, switch 94 will open and the voltage across capacitor 304 will be stabilized.

It is desirable in a speed control system for an automotive vehicle to deenergize the speed control system and render it inoperative when the brakes of the vehicle are applied. This is accomplished in the present invention through the use of the stop lamp switch connected to the taillights of the vehicle. Referring now to FIG. 2a there is shown a stop switch 770 having a contact 772 connected to the positive terminal of the source of electrical energy 40 which is shown in dotted lines. A movable blade 774 of the stop lamp switch is operated by the depression of the brake pedal so that it comes in contact with contact 772 to energize stop lamp 776. This connects the positive terminal of the source of electrical energy 40 to lead 778 and current will flow through diode 780 to both leads 84 and 82. From lead 84, current will flow through resistor 86, diode 88, lead 90 to ground through the solenoid or winding 92 and this action closes switch 94. The positive potential on lead 82 is applied through diode 96, lead 98, lead 100, lead 102, closed switch 94 to the control or gate electrode 104 of solid-state amplifier or field-effect transistor 105 thereby bringing the gate voltage to the positive potential of the source of electrical energy 40. This renders the solid-state amplifier or field-effect transistor 105 nonconductive and deenergizes the speed control system since line 100 is at a voltage equal to the positive voltage of the source of electrical energy 40. Current may also flow through resistor 702, diode 704, lead 706, the solenoid 456 of the vacuum valve 578 to ground via leads 458, 460 and line 168. The value of the resistance 704, however, is large enough to prevent sufficient current flow through the solenoid 456 so that the vacuum valve will remain in its closed position.

The capacitor 660 is a polarized capacitor and the diode 782 connected across it will allow only approximately 0.7 volts reverse voltage across it when the brakes are applied. Also the diode 692 in this case prevents capacitor 660 from discharging through the winding 92 thereby preventing undesired speed setting after the application of the brakes. It should be noted that when the switch 774 is closed the plate of the capacitor adjacent the junction 662 will be charged positively and the other plate will be charged negatively. This is the reverse of the case where the capacitor 660 is charged through the transistor 644 during speed setting operations.

The speed control system of the present invention also includes a low speed error inhibit which will deenergize the speed control system when the actual speed of the vehicle falls below the desired or set speed by a predetermined amount, for example, 10 m.p.h. This low speed error inhibit feature includes a switching transistor 784 shown in the lower right-hand side of FIG. 2. The collector 786 of this transistor is connected to lead 70, while the emitter 788 is connected to ground through leads 74 and 76. The base 790 is connected to a junction 792 and this junction in turn is connected through lead 794 and resistor 795 to the emitter 332 of transistor 320. A charging capacitor 798 is connected between junction 792 and grounded lead 74.

When a given speed error is reached, for example, when the desired or set speed of the vehicle is approximately 10 m.p.h. above the actual speed, the voltage at the junction of emitter 332 of transistor 320 and across resistor 334 is sufficiently high to switch transistor 784 into its conducting state. Switching of transistor 784 into its conducting state lowers the base 130 voltage of transistor 133 to approximately ground potential. This turns transistor 133 to its nonconducting state thereby eliminating a path for current to flow out of base 148 of transistor 150 and switching it to its nonconducting state. This shuts off or deenergizes line 64 thereby deenergizing line 156, line 158 and the complete speed control system.

It should be noted that if the vehicle operator depresses the brake pedal, this action should disable the speed control system and this large speed error should not occur. However, if there is a failure in the brake electrical circuit so that the depression of the brake pedal does not deenergize the system by applying the high potential through means previously described to the control or gate electrode 104 of solid-state amplifier or field-effect transistor 105 then the speed control system would attempt to override the braking action and would increase the throttle setting as the brakes are continued to be applied. Therefore, this low speed error inhibit feature is a safety mechanism which will deenergize the speed control system should there be a brake electrical system failure.

Referring now to FIG. 3, there is shown a modification of the speed control system shown in FIGS. 2 and 2a. In this embodiment of the invention, the transistors 198 and 226 have been eliminated and the base 214 of transistor 212 is connected through resistor 194 to a junction 800. This junction is connected intermediate a resistor 802 connected to line 176 and the anode of diode 804. The cathode of the diode 804 is connected to one terminal of output winding 180 of the generator which is part of the speed pickup 12, while the other end of this winding is connected to line 168 and ground. The transistor 212 is normally in a nonconducting or in a slightly conducting state, because current may flow from the line 176 to the line 168 through the series circuit comprising resistor 802, diode 804 and output winding 180.

As the rotor 182 of the electrical generator is rotated, it will alternately cause a positive voltage and a negative voltage to be applied to the cathode of diode 804. When the positive voltage is applied, the diode 804 will be back biased and will not conduct current. Therefore, current flows from junction 800 through resistor 194, through the base 214—emitter 216 circuit of transistor 212 to ground or line 168. This switches the transistor 212 into a highly conducting saturated state. When the negative pulse appears at the cathode of diode 804, the transistor 212 will be switched rapidly to a nonconducting or low conduction state since current is diverted from the base 214. As a result, pulses of voltage will appear at the junction 236 as was the case with the embodiment shown in FIGS. 2 and 2a and these pulses will be applied to the frequency to voltage converter 14. An output voltage will appear at the junction 312 and across resistor 280 at the emitter 278 of transistor 270 which is a function of the actual speed of the vehicle and is represented by $V_s$.

In addition, the output means connected to the differential amplifier 26—28 which energizes the solenoid or winding 456 of the vacuum valve 578 and the solenoid or winding 422 of the atmosphere valve 580 has been modified. As can be seen by the drawing, the collector 398 of transistor 354 is connected through resistor 810 to the base 812 of amplifying transistor 814. The emitter 816 of this transistor is connected to line 158 through resistor 818, while the collector 820 is connected to line 168 and hence ground through lead 822, diode 824 and resistor 826.

A junction 828, positioned intermediate the lead 822 and the diode 824, is connected through resistor 830 to the base 832 of the transistor 834. The emitter 836 of transistor 834 is connected to line 168 and hence ground through a voltage dropping diode 838, and the collector 840 is connected through lead 842 to one terminal of the solenoid or winding 456 of the vacuum valve 578. The other terminal of the solenoid or winding is connected to the line 158. Similarly, the junction 828 is connected through resistor 844 to the base 846 of transistor 848. The emitter 850 of transistor 848 is connected directly to lead 168, or ground, while the collector 852 is connected through lead 854 to one terminal of the solenoid or winding 422 of the atmosphere valve 580. The other terminal of this solenoid or winding 422 is connected, as shown, to the line 158.

Moreover, the lead 100 which is connected to lead 102 and hence switch 94 at one end is returned to line 168 or ground through the junction 700, diode 704 and resistor 826. Additionally, the contact of switch 316 in this embodiment is not returned to the junction 288 and hence collector 290 of transistor 282, rather it is isolated from them by a diode 860 connected in line 774 and poled to permit current flow from line 158 through resistor 284, junction 288, lead 292, diode 860, lead 774 and closed switch 316 to provide the low speed inhibit function described in relationship to FIGS. 2 and 2a. However, during the accelerate set mode when switch 316 is closed, the gate 104 of the solid-state amplifier or field-effect transistor 105 is connected through closed switch 316, lead 774, lead 862, resistor 864 and lead 866 to a tap 868 on resistor 338. Another resistor 870 is connected to the end of resistor 338 and to the junction between emitter 332 of transistor 320 and resistor 334. It can be appreciated that the diode 860 will block current flow from the control or gate electrode 104 of solid-state amplifier or field-effect transistor 105 to the collector 290 of transistor 282 when switch 316 is closed.

The embodiment shown in FIG. 3 operates the same as the embodiment shown in FIGS. 2 and 2a to control the speed of the vehicle and the diode 838 connected to the amplifying transistor 834 serves the same purpose of diodes 444 and 446 connected to the Darlington amplifier 412 shown in FIG. 2a. Additionally, during the set speed or coast set operations, with switch 94 closed, control or gate electrode 104 of the solid-state amplifier or field-effect transistor 105 is connected to ground through the previously described, i.e., lead 102, lead 100, junction 700, diode 704 and resistor 826. When the transistor 814 connected to the output of the differential amplifier comes into conduction sufficiently to actuate the atmosphere valve 580 and the vacuum valve 578, the diode 704 will be back biased thereby stopping the discharge of the capacitor 304 connected to control or gate electrode 104 of solid-state amplifier or field-effect transistor 105. A setting of a voltage across capacitor 304 which corresponds to the set or desired speed of the vehicle will then be achieved. This voltage is designated as $V_r$ in FIG. 1.

Additionally, during the accelerate set operation in which the pushbutton rocker switch 620 is actuated to bring the movable blade 624 into contact with contact 636 on FIG. 2, the control or gate electrode 104 of solid-state amplifier or field-effect transistor 105 will be connected to the tap 868 on resistor 338 through the closed switch 316, lead 774, lead 862, resistor 864 and lead 866. This causes the capacitor 304 to discharge toward a voltage which increases when the voltage of the control or gate electrode 104 of the solid-state amplifier or field-effect transistor 105 decreases. This is true because a decreasing voltage on the control or gate electrode 104 causes an increase in the conduction of the solid-state amplifier or field-effect transistor 105, an increase in the conduction of transistor 320, and an increase in the conduction of transistor 322 thereby lowering its resistance and increasing the voltage at the tap 868. This effectively produces negative feedback through resistor 864 around the speed error amplifier comprised of field-effect transistor 105, transistor 320 and transistor 322.

The above described negative feedback makes the accelerate function much smoother and exercises better control of the rate of vehicle acceleration by decreasing the effect of component tolerances. It also imposes a definite lower limit on the control or gate electrode voltage of solid-state amplifier or field-effect transistor 105 as the discharging operation of capacitor 304 takes place during the accelerate mode condition. This is important since a heavily loaded vehicle ascending a grade may be incapable of accelerating at a rate at which capacitor 304 discharges, thus allowing the memory voltage, or $V_r$, across capacitor 304 to increase much out of proportion to the instantaneous vehicle speed. When the switch 316 is subsequently opened, the speed stored, or $V_r$, across capacitor 304, could be much greater than that at which the driver causes switch 316 to open thereby causing the vehicle to accelerate when road load decreases. The present connection described above positively prevents this effect.

It should also e noted in relation to FIG. 3 that a lead 880 from the junction 882 of diodes 80, 96 and lead 82 has been added. This lead is connected to the base 214 of transistor 212 through diode 883, lead 884 and resistor 886. Thus, whenever a positive potential is present at junction 882, it will be applied to base 214 of transistor 212 sending it into a steady state saturated or heavily conducting condition. When this occurs, it effectively prevents the operation of the frequency to voltage converter 14 and results in a zero output at the emitter 278 of transistor 270 and across resistor 280.

As explained in relationship to the description of FIGS. 2 and 2a, the junction 882 is raised to a high positive potential upon the application of the brake pedal which closes switch 770, turning the system off by operating the pushbutton rocker type switch 110 so that conductive blade 112 comes into contact with its adjacent contact, or by turning the ignition switch 48 to the "on" position, i.e., closing ignition switch 48. The closing of ignition switch 48 includes turning the ignition switch to either the "on" or the "accessory on" position. Any one of these actions also sends current through the winding 92 and closes switch 94 and at the same time applies a high positive potential on the line 100. This raises the voltage on the gate 104 of solid-state amplifier or field-effect transistor 105 and disabling the remainder of the speed control system. The zero output of the frequency to voltage converter 14 eliminates the possibility of the system resuming automatic control at a lower speed, for example, 25 m.p.h., (after the vehicle is allowed to coast from the high to the low speed) following a brake engaging and disengaging action at high speed, for example, 80 m.p.h.

Another embodiment of the invention is shown in FIG. 4. This embodiment is identical to the embodiment shown in FIG. 3 except for the throttle position transducer 34. The throttle position transducer 34 in this embodiment is a potentiometer comprising a first resistor 900 having one terminal connected to line 176 through lead 902, and a variable resistor 904 having one terminal connected to the other terminal of resistor 900 through lead 906. The other terminal of the variable resistor 904 is connected to one terminal of fixed resistor 908 through lead 910, while the other terminal of fixed resistor 908 is connected to ground or lead 168 through lead 912. The variable or movable wiper arm 914 of the variable resistor 904 will change the voltage applied to the base 360 of transistor 350 of differential amplifier 26—28 as it is moved and will apply an increasing voltage as it is moved upwardly in FIG. 4. In all other respects the circuit of FIG. 4 operates the same as the circuit of FIG. 3.

The variable resistor 904 is positioned in the vacuum actuator or servomotor 32 shown in FIG. 6, and the movable arm 914 is affixed to a plate 916 positioned in an annular recess 918 of a support means 920 for spring 614. This support means has a lower protuberance 922 bearing on a complementary indentation 924 positioned in plate 564 affixed to diaphragm 548. This vacuum motor is fully disclosed and claimed in copending application Ser. No. 781,170, filed Dec. 4, 1968, in the name of Gary F. Woodward and assigned to the assignee of this invention.

For purposes of explanation here, the lead 515 shown in FIG. 4 is connected to a terminal 926 which, in turn, is connected to a conductive bar 928 contacted by the movable conductive arm 914. The resistor 904 is energized from lead 906 through terminal 930 and conductive bar 932, and a terminal 933 is connected to the other end of the resistor 904. This terminal 933 is connected to lead 910.

The vacuum actuator or servomotor 32 shown in FIG. 6 includes the vacuum valve 578 and the atmosphere valve 580 shown in FIG. 5 and they are connected and operated the same as the valves of the vacuum actuator or servomotor 32 shown in FIG. 5. Thus, as the diaphragm 548 shown in FIG. 6 is moved to the right, upon increasing vacuum in the chamber 598, thereby causing an opening of the controller means or throttle 524 and an increase in the angle $\theta$, the wiper arm 914 moves to the right and causes less and less of the resistor 904 to be connected in circuit with the lead 515. This raises the potential on line 515 as the wiper arm moves to the right, and it causes an increasing potential to be applied to the base 360 of transistor 350 of differential amplifier 26—28, thus providing the feedback voltage, $V_\theta$, the same as the feedback oscillator comprised of solid state active device 484 and tank circuit 486 disclosed in FIG. 2a and FIG. 3.

The present invention, therefore, provides a reliable, durable and accurate speed control system for an internal combustion engine vehicle. This system permits wide tolerances in the values of the components used so that it is unnecessary to use expensive components whose values have been selected within narrow ranges of tolerances. It also eliminates adjustments or calibrations at the time of assembly, and it automatically compensates for changes in parameters of components due to temperature and aging. It also includes means for setting a memory voltage, or a voltage which is a function of or corresponds to a desired speed setting, with a minimum of initial error. This is done by setting the voltage across the capacitor when the servomotor or vacuum motor starts to operate to control the controller means or throttle of the internal combustion engine.

The nulling loop concept for setting the memory voltage, $V_r$, a voltage which is a function of or corresponds to a desired speed setting, provides many advantages. This nulling loop concept, as explained fully in the specification, sets the voltage across the memory capacitor connected to the control or gate electrode of the high input impedance amplifier or field effect transistor when the servomotor or vacuum motor initially commences to operate or control the controller means of the internal combustion engine. This permits the use of standard wide tolerance and unmatched components, while providing a low set speed error. This is accomplished without the need for any "tuning" or adjustment of the assembled speed control system. In addition, this nulling loop concept of setting speed minimizes effects on system performance of changes in the device parameters with temperature, age and supply voltage.

The present invention also provides a latching feature in which the system may be conditioned for operation by merely depressing a pushbutton switch and then releasing it. It also provides for initial conditioning of the speed control system by disenabling the speed control function when (1) the ignition switch of the vehicle is turned to the "on" position, (2) the brake pedal is depressed and (3) the on-off rocker switch of the system is switched to either position. It also includes a large speed error inhibit function which will disenable the speed control system if the actual speed of the vehicle falls below the desired or set speed by a predetermined amount. Additionally, it provides a low speed inhibit function which will prevent the speed control system from operating at speeds below a predetermined value, for example, 25mph.

Although the solid-state amplifier 105 has been disclosed and described as a P-channel, metal over oxide, field-effect transistor, it will be readily apparent to those skilled in the art that an N-channel field-effect transistor may be employed. If the N-channel field-effect transistor is employed, the current flow from the bate of the transistor during the speed setting, cutoff and speed correcting operations will be opposite to the current flow from the gate of P-channel type field-effect transistor shown and described in the application. Moreover, the output from the frequency to voltage converter must be of opposite polarity so that the voltage decreases as the speed of the vehicle increases. It is well within the capability of one skilled in the art to make the necessary polarity changes for accommodating the use of an N-channel type field-effect transistor in the speed control system of the present invention.

We claim:

1. A speed control system for an automotive vehicle having an internal combustion engine, comprising controller means coupled to the internal combustion engine for controlling the power output of the engine, means for producing a first electrical signal corresponding to the actual speed of the vehicle, means for producing a second electrical signal corresponding to the position of said controller means, power actuating means coupled to said controller means for controlling the position of said controller means, said power actuating means including an atmosphere valve and a vacuum valve, each of said valves having a winding, a solid-state switching means connected to control each of said windings, each of said solid-state switching means having an input circuit, a memory means including a high input impedance amplifier having a control electrode and a capacitor having one terminal connected to said control electrode and the other terminal coupled to said means for producing said first electrical signal for storing a third electrical signal corresponding to the desired speed of the vehicle, means receiving said first, said second and said third signals and combining said signals to produce an actuating error signal, the input circuit of each of said solid-state switching means being connected to receive the actuating error signal, a normally open switch having one terminal connected to said control electrode of said high input impedance amplifier and a diode connecting the other terminal of said switch to a point intermediate one of said windings and one of said solid-state switching means, said diode being poled to permit current flow between said control electrode and said winding until said solid-state switching means commences to conduct, and means operable by the vehicle operator for closing said normally open switch.

2. The combination of claim 1 in which said high input impedance amplifier comprises a field-effect transistor and said control electrode is the gate electrode of said field-effect transistor.

3. A speed control system for an automotive vehicle having an internal combustion engine comprising controller means coupled to the internal combustion engine for controlling the power output of the engine, means for producing a first electrical signal corresponding to the actual speed of the vehicle, a memory means comprising a capacitor and a high input impedance amplifier having a control electrode and a pair of output electrodes, one of the terminals of said capacitor connected to said means for producing the first electrical signal and the other terminal of said capacitor connected to the control electrode of said high input impedance amplifier, a source of electrical energy, an ignition switch connected to said source of electrical energy and to the ignition system of the internal combustion engine, and circuit means coupled to said source of electrical energy and said ignition switch for connecting said source of electrical energy to said control electrode momentarily but for a sufficient length of time to place a voltage on said gate electrode of a magnitude and a polarity to render said high input impedance substantially nonconductive when said ignition switch is closed.

4. The combination of claim 3 including electrically controlled power actuator means coupled to said controller means for controlling the position of said controller means, circuit means coupled to one of the output electrodes of said high input impedance amplifier means and said electrically controlled power actuator, said speed control system including a first switching means coupled to said source of electrical energy for coupling said source of electrical energy to said speed control system including connecting said source of electrical energy across the output electrodes of said high input impedance amplifier and said first mentioned means and to said electrically controlled power actuator.

5. The combination of claim 4 including means coupled to one of said output electrodes of said high input impedance amplifier for disconnecting said source of electrical energy from said speed control system including the output electrodes of said high input impedance amplifier, said electrically operated power actuator and said means for producing a voltage corresponding to vehicle speed when the actual speed of the vehicle falls below the desired speed of the vehicle by a predetermined amount.

6. The combination of claim 4 including a second switching means coupled to said source of electrical energy for coupling said control electrode of said high impedance input amplifier to said circuit means coupled to one of said output electrodes and to said electrically controlled power actuator, said circuit means including means for changing the voltage on said control electrode to a value where said high input impedance amplifier conducts sufficiently to actuate said electrically controlled power actuator whereby a voltage corresponding to the desired speed of the vehicle is set across said capacitor.

7. The combination of claim 6 in which said automotive vehicle has a stop lamp, a brake pedal, a switch actuated when said brake pedal is depressed to apply the brakes of the vehicle, said switch when actuated coupling said stop lamp to said source of electrical energy, and circuit means coupled to said switch and to said control electrode of said high input impedance amplifier for applying a voltage from said source of electrical energy to said control electrode of a magnitude and polarity to render the high input impedance amplifier substantially nonconductive and said speed control system inoperative.

8. The combination of claim 6 including means coupled to said one of said output electrodes of said high input impedance amplifier for disconnecting said source of electrical energy from said speed control system including the output electrodes of said high input impedance amplifier, said electrically operated power actuator and said means for producing a voltage corresponding to vehicle speed when the actual speed of the vehicle falls below the desired speed of the vehicle by a predetermined amount.

9. The combination of claim 6 including means for increasing the desired speed of the vehicle when the vehicle is under the control of the speed control system comprising, an acceleration set switch of the pushbutton type, and circuit means including a normally open switch connected between the control electrode of said high input impedance amplifier and a reference voltage circuit, means coupled to said acceleration set switch and said source of electrical energy for closing said normally open switch during the time said acceleration set switch is closed whereby the voltage of said control electrode of said high input impedance amplifier is changed in a direction to increase the conduction of said high input impedance amplifier and to increase the speed of the vehicle, and circuit means coupled to said acceleration set switch for coupling said control electrode of said high input impedance amplifier to said circuit means coupled to one of said output electrodes and to said electrically controlled power actuator when said acceleration set switch is opened momentarily, but for a sufficient length of time to set a voltage corresponding to a new desired speed across said capacitor.

10. The combination of claim 6 including means for decreasing the desired speed of the vehicle when the vehicle is under the control of the speed control system comprising a coast set switch of the pushbutton type, circuit means coupled to said coast set switch and said source of electrical energy for connecting said source of electrical energy to said control electrode momentarily, but for a sufficient length of time to place a voltage on said control electrode of substantially equal potential to the terminal voltage of said source of electrical energy when said coast set switch is closed, and for coupling said control electrode to said electrically controlled power actuator for a sufficient period of time thereafter to set a voltage across said capacitor corresponding to the new desired speed.

11. The combination of claim 3 in which the automotive vehicle has a brake pedal, and means coupled to said source of electrical energy, said control electrode of said high input impedance amplifier and said brake pedal for applying a voltage from said source of electrical energy to said control electrode when said brake pedal is depressed of a magnitude and polarity to render said high input impedance amplifier substantially nonconductive and said speed control system inoperative.

12. A speed control system for an automotive vehicle having an internal combustion engine comprising controller means coupled to the internal combustion engine for controlling the power output of the engine, a memory system comprising a high input impedance amplifier and a capacitor, said high input impedance amplifier having an input circuit comprising a control electrode and second electrode, an output circuit including said second electrode and a third electrode, a capacitor having one terminal connected to said control electrode, means for generating a voltage corresponding to the actual speed of the vehicle, said means connected to the other terminal of said capacitor and applying said voltage thereto, means coupled to said control electrode and said one terminal of said capacitor for setting a voltage across said capacitor corresponding to the desired speed of the vehicle, and a power actuator means coupled to said controller means for controlling the position of said controller means, said power actuator including electrically operated means for controlling the position of said power actuator, and circuit means coupled to the electrically operated means of said power actuator and to the output circuit of said high input impedance amplifier for positioning said power actuator and said controller means as a function of the conduction of said high input impedance amplifier, and means coupled to the output circuit of said high input impedance amplifier and to said means for generating a voltage corresponding to the actual speed of the vehicle for rendering the voltage of said means substantially zero when the actual speed of the vehicle falls below the desired speed of the vehicle by a predetermined amount.

13. A speed control system for an automotive vehicle having an internal combustion engine, comprising controller means coupled to the internal combustion engine for controlling the power output of the engine, means for producing a first electrical signal corresponding to the actual speed of the vehicle, means producing a second electrical signal corresponding to the position of said controller means, power actuating means coupled to said controller means for controlling the position of said controller means, a memory means including a high input impedance amplifier having a control electrode and a capacitor having one terminal connected to said control electrode and the other terminal coupled to said means for producing said first electrical signal for storing a third electrical signal corresponding to the desired speed of the vehicle, means receiving said first, said second and said third signals and combining said signals to produce an actuating error signal, circuit means coupled to said last mentioned means and said power actuating means for applying said actuating error signal to said power actuating means, a source of direct current electrical energy, an ignition switch for the internal combustion engine coupled to said source of electrical energy, a brake pedal for operating the braking system, a switch actuated when said brake pedal is depressed coupled to said source of electrical energy, an on-switch coupled to said source of electrical energy and to said speed control system, and circuit means coupled to said source of electrical energy and to said control electrode of said high input impedance amplifier through each of said switches for applying a voltage from said source of electrical energy to said control electrode of said high input impedance amplifier of a magnitude and polarity to render said high input impedance amplifier inoperative when any one of said switches is actuated.

14. The combination of claim 13 and further comprising a low speed inhibit circuit means coupled to said means for producing said first electrical signal corresponding to the actual speed of the vehicle, a speed setting switch coupled to said control electrode for setting said third signal across said capacitor when actuated, and means coupled to said switch, said control electrode, said source of electrical energy and said low speed inhibit circuit for applying a voltage to said control electrode of a magnitude and polarity to render said high input impedance amplifier nonconductive when said switch is actuated and the actual speed of the vehicle is below a predetermined speed.

15. A speed control system for an automotive vehicle having an internal combustion engine, comprising controller means coupled to the internal combustion engine for controlling the power output of the engine, means for producing a first electrical signal corresponding to the actual speed of the vehicle, means for producing a second electrical signal corresponding to the position of said controller means, power actuating means coupled to said controller means for controlling the position of said controller means, a memory means including a high input impedance amplifier having a control electrode and a capacitor having one terminal connected to said control electrode and the other terminal coupled to said means for producing said first electrical signal for storing a third electrical signal corresponding to the desired speed of the vehicle, means receiving said first, said second and said third signals and combining said signals to produce an actuating error signal, a source of electrical energy having a positive terminal and a negative terminal, an ignition switch for the internal combustion engine connected to one of said terminals of said source of electrical energy, and switch means actuated when said ignition switch is closed for connecting none of said terminals of said source of electrical energy to said control electrode of said high input impedance amplifier and said terminal of said capacitor connected thereto momentarily but for sufficient period of time to charge said terminal of said capacitor to substantially the terminal voltage of said source of electrical energy, the polarity of said charge being such as to render said high input impedance amplifier nonconductive.

16. A speed control system for an automotive vehicle having an internal combustion engine, comprising controller means coupled to the internal combustion engine for controlling the power output of the engine, means for producing a first electrical signal corresponding to the actual speed of the vehicle, means for producing a second electrical signal corresponding to the position of said controller means, power actuating means coupled to said controller means for controlling the position of said controller means, said power actuating means including an atmosphere valve and a vacuum valve, each of said valves having a winding, a solid-state switching means connected to control each of said windings, each of said solid-state switching means having an input circuit, a memory means including a high input impedance amplifier having a control electrode and a capacitor having one terminal connected to said control electrode and the other terminal coupled to said means for producing said first electrical signal for storing a third electrical signal corresponding to the desired speed of the vehicle, means receiving said first, said second and said third signals and combining said signals to produce an actuating error signal, the input circuit of each of said solid-state switching means being connected to receive the actuating error signal, a source of electrical energy, circuit means connecting said source of electrical energy to said windings and said solid-state switching means for each of said valves, circuit means including a normally open switch connecting said control electrode to the junction of one of said windings and the corresponding solid-state switching means, said circuit means including unilateral conducting means connected in series with said normally open switch and poled to permit current flow in one direction between the control electrode and the junction and preventing current flow in the opposite direction, a vehicle operator actuated switching means for setting the speed of the vehicle when actuated, and circuit means coupled to said source of electrical energy for closing said normally open switch when said vehicle operator actuated switching means is actuated whereby the voltage on said control electrode of said high input impedance amplifier is changed by charge flowing through said winding until said solid-state switching device commences to conduct and the winding of said one of said valves of said vacuum motor is energized.